(12) United States Patent
Bennett et al.

(10) Patent No.: US 12,549,250 B1
(45) Date of Patent: Feb. 10, 2026

(54) SYSTEMS AND METHODS FOR FIBER UPSTREAM TRACE DETERMINATION

(71) Applicant: FRONTIER COMMUNICATIONS HOLDINGS, LLC, Dallas, TX (US)

(72) Inventors: Ryan C. Bennett, Arlington, WA (US); Jeremy S. Papke, Monroe, WA (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/184,824

(22) Filed: Apr. 21, 2025

Related U.S. Application Data

(63) Continuation of application No. 18/800,598, filed on Aug. 12, 2024, now Pat. No. 12,294,407.

(51) Int. Cl.
*H04J 14/00* (2006.01)
*H04B 10/07* (2013.01)
*H04B 10/27* (2013.01)
*H04J 14/02* (2006.01)
*H04Q 11/00* (2006.01)

(52) U.S. Cl.
CPC ............ *H04B 10/07* (2013.01); *H04B 10/27* (2013.01); *H04B 10/271* (2013.01); *H04J 14/00* (2013.01); *H04J 14/0227* (2013.01); *H04J 14/023* (2013.01); *H04J 14/0267* (2013.01); *H04Q 11/0005* (2013.01); *H04Q 11/0062* (2013.01); *H04Q 2011/0073* (2013.01); *H04Q 2011/0083* (2013.01)

(58) Field of Classification Search
CPC ...... H04B 10/07; H04B 10/27; H04B 10/271; H04J 14/00; H04J 14/0227; H04J 14/023; H04J 14/0267; H04Q 11/0005; H04Q 11/0062; H04Q 2011/0073; H04Q 2011/0083
USPC ......................................... 398/9–38, 43–103
See application file for complete search history.

(56) References Cited

U.S. PATENT DOCUMENTS

| | | | |
|---|---|---|---|
| 5,983,068 A | 11/1999 | Tomich et al. | |
| 6,130,890 A | 10/2000 | Leinwand et al. | |
| 6,144,471 A | 11/2000 | Eyberg et al. | |
| 6,681,083 B1 * | 1/2004 | Koonen | H04J 14/0221 398/171 |

(Continued)

FOREIGN PATENT DOCUMENTS

| | | |
|---|---|---|
| EP | 1560364 A1 | 8/2005 |
| WO | WO-2007110579 A1 | 10/2007 |

*Primary Examiner* — Dibson J Sanchez
(74) *Attorney, Agent, or Firm* — MARSHALL, GERSTEIN & BORUN LLP

(57) ABSTRACT

Systems and methods for performing an upstream trace operation are presented. An exemplary method may include obtaining an indication of a new service location of a passive optical network (PON); detecting a physical polyline route, within the PON, from an on-ramp facility corresponding to the new service location to a serving office of the PON, the detecting based on (i) respective geospatial locations of a plurality of optical components of the PON, and (ii) interconnections of the plurality of optical components, and the plurality of optical components including the on-ramp location, a terminal disposed at the serving office, and at least one optical fiber optically connecting the on-ramp location and the terminal; and causing optical services to be delivered from the serving office to the new service location via the detected physical polyline route.

18 Claims, 8 Drawing Sheets

(56) References Cited

U.S. PATENT DOCUMENTS

| | | |
|---|---|---|
| 6,912,221 B1 | 6/2005 | Zadikian et al. |
| 7,676,154 B2 | 3/2010 | Vukovic et al. |
| 7,885,549 B1 | 2/2011 | Thinguldstad et al. |
| 9,319,758 B2 | 4/2016 | Goswami et al. |
| 10,678,015 B1 | 6/2020 | Measels |
| 12,114,114 B1 | 10/2024 | Valdez |
| 2002/0019699 A1 | 2/2002 | McCarty et al. |
| 2004/0105451 A1 | 6/2004 | Boduch et al. |
| 2004/0246973 A1* | 12/2004 | Hoang ............... H04L 45/50 370/395.21 |
| 2005/0175343 A1* | 8/2005 | Huang ............... H04J 14/025 398/66 |
| 2005/0185631 A1 | 8/2005 | Bernard et al. |
| 2005/0185967 A1 | 8/2005 | Hoshida |
| 2005/0232567 A1 | 10/2005 | Reagan et al. |
| 2005/0244161 A1 | 11/2005 | Satoh |
| 2006/0215636 A1 | 9/2006 | Corley et al. |
| 2007/0281685 A1 | 12/2007 | Pan et al. |
| 2008/0008102 A1* | 1/2008 | Bardalai ............ H04J 14/0241 370/242 |
| 2008/0013694 A1 | 1/2008 | Ward |
| 2008/0013950 A1* | 1/2008 | Boudreault ........ H04J 14/0216 398/59 |
| 2009/0074403 A1 | 3/2009 | Chi et al. |
| 2009/0198832 A1* | 8/2009 | Shah .................. H04L 43/10 709/239 |
| 2009/0274463 A1 | 11/2009 | Bernard et al. |
| 2010/0098407 A1 | 4/2010 | Goswami et al. |
| 2010/0290782 A1 | 11/2010 | Lee et al. |
| 2011/0170865 A1 | 7/2011 | Zheng |
| 2011/0188849 A1 | 8/2011 | Haramaty et al. |
| 2011/0268435 A1* | 11/2011 | Mizutani ........... H04L 45/243 398/5 |
| 2012/0039331 A1* | 2/2012 | Astigarraga ........ H04L 45/26 370/389 |
| 2012/0226520 A1 | 9/2012 | Blasius et al. |
| 2012/0321296 A1* | 12/2012 | Wellbrock ...... H04J 14/02122 398/5 |
| 2013/0156427 A1* | 6/2013 | Lopez ............... H04L 12/4633 398/52 |
| 2013/0279900 A1* | 10/2013 | Kim .................. H04J 14/0247 398/3 |
| 2014/0226966 A1 | 8/2014 | Lutgen |
| 2015/0200838 A1* | 7/2015 | Nadeau ............... H04L 45/50 370/254 |
| 2016/0112136 A1 | 4/2016 | Urban |
| 2016/0173192 A1 | 6/2016 | Wilson et al. |
| 2016/0283345 A1* | 9/2016 | Gounares ........... G06F 3/0482 |
| 2017/0279525 A1 | 9/2017 | Qu et al. |
| 2017/0288778 A1 | 10/2017 | Shen et al. |
| 2018/0145843 A1 | 5/2018 | Choi et al. |
| 2019/0014036 A1* | 1/2019 | Anand ............... G06F 16/2477 |
| 2019/0197846 A1 | 6/2019 | Englund |
| 2020/0221193 A1 | 7/2020 | Dieselberg |
| 2020/0267455 A1 | 8/2020 | Gray et al. |
| 2020/0267498 A1 | 8/2020 | Draper et al. |
| 2020/0336809 A1 | 10/2020 | Zhang et al. |
| 2022/0383271 A1 | 12/2022 | Sawant et al. |
| 2022/0405725 A1 | 12/2022 | Grossman et al. |
| 2023/0062982 A1* | 3/2023 | Patterson ........... H04B 10/07 |
| 2024/0267704 A1 | 8/2024 | Gray et al. |

\* cited by examiner

SYSTEMS AND METHODS FOR FIBER UPSTREAM TRACE DETERMINATION

CROSS-REFERENCE TO RELATED APPLICATIONS

The present application is a continuation of U.S. patent application Ser. No. 18/800,598 entitled "Systems and Methods for Fiber Upstream Trace Determination" and filed on Aug. 12, 2024, the disclosure of which is hereby incorporated by reference herein in its entirety.

FIELD OF THE DISCLOSURE

This disclosure relates generally to networking systems, and, more particularly, to methods and systems within a passive optical network (PON) for performing a fiber upstream trace determination operation.

BACKGROUND

A conventional PON includes one or more pieces of network service equipment, such as terminals (e.g., optical line terminals (OLTs)), at a central location connecting to one or more last mile termination units (LMTUs) disposed at respective customer premises (e.g., physical locations serviced by the PON) via one or more fibers. A PON is typically implemented using a point-to-multipoint topology in which a feeder fiber from a terminal, such as an OLT, serves multiple last mile termination units. An LMTU may be, for example, an optical network terminal (ONT) or an optical network unit (ONU) that is optically connected to the terminal via a respective last mile distribution optical fiber received at the LMTU. Typically, the distribution optical fibers for respective ones of the LMTUs are coupled to a feeder optical fiber via a fiber distribution hub (FDH) using an optical splitter. One or more fiber distribution terminals (FDTs) may be utilized to provide many-to-one optical connections between various sets of optical fibers, e.g., to connect a feeder optical fiber to multiple distribution optical fibers, to connect a distribution optical fiber to multiple other last mile optical fibers respectively received at multiple LMTUs, etc.

When connecting a new or prospective service location to a PON, typically a technician determines a location at which an optical fiber can be spliced or otherwise connected to connect the prospect service location to the PON. However, as such techniques are often highly reliant on the individual knowledge and experience of technicians, such techniques can fail to consider a number of factors that can affect services provided to the new service location. For example, when a technician relies on convenience or proximity in determining a splice point, factors such as equipment, capabilities, and loading of network entities (such as serving centers, central offices, and/or terminals) and/or of network components may go undetected and unconsidered, and in particular in situations when portions of the PON have been moved or modified unbeknownst to the technician. As such, the connection of the prospect service location may not be able to provide the various services requested by a customer, and/or the prospect service location may be incorrectly determined to have no nearby network access location to support the various requested capabilities. Additionally, such conventional techniques are highly manual, cost-intensive, and time-intensive, as they require technicians to physically travel to the vicinity of a prospect service location to investigate possible locations for splicing. Moreover, such conventional techniques can be inconsistent across multiple technicians and may result in inefficient and/or suboptimal usage of PON resources.

Furthermore, such conventional techniques do not consider external network providers and/or external service providers, and therefore may lead to a service location requiring a larger path and subsequent footprint to bring the prospect service location into the network. Still further, various types of redundancies for a prospect service location may not be considered under conventional techniques. As such, improved methodologies for detecting options for a prospect service location with regard to splice points, network options, and/or redundancies is desirable.

SUMMARY

In some aspects, the techniques described herein relate to a method, including: obtaining, by one or more processors, an indication of a new service location of a passive optical network (PON); detecting, by the one or more processors, a physical polyline route, within the PON, from an on-ramp facility corresponding to the new service location to a serving office of the PON, the detecting based on (i) respective geospatial locations of a plurality of optical components of the PON, and (ii) interconnections of the plurality of optical components, and the plurality of optical components including the on-ramp facility, a network serving equipment disposed at the serving office, and at least one optical fiber optically connecting the on-ramp facility and the network serving equipment; and causing, by the one or more processors, end-user services to be delivered from the serving office to the new service location via the detected physical polyline route.

In some aspects, the techniques described herein relate to a system for tracing fibers upstream for a service location of a passive optical network (PON) of a PON service provider, the system including: one or more processors; and one or more memories storing a set of computer-executable instructions that, when executed by the one or more processors, cause the system to: obtain an indication of a new service location of a PON; detect a physical polyline route, within the PON, from an on-ramp facility corresponding to the new service location to a serving office of the PON, the detecting based on (i) respective geospatial locations of a plurality of optical components of the PON, and (ii) interconnections of the plurality of optical components, and the plurality of optical components including the on-ramp facility, a network serving equipment disposed at the serving office, and at least one optical fiber optically connecting the on-ramp facility and the network serving equipment; and cause end-user services to be delivered from the serving office to the new service location via the detected physical polyline route.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1A:
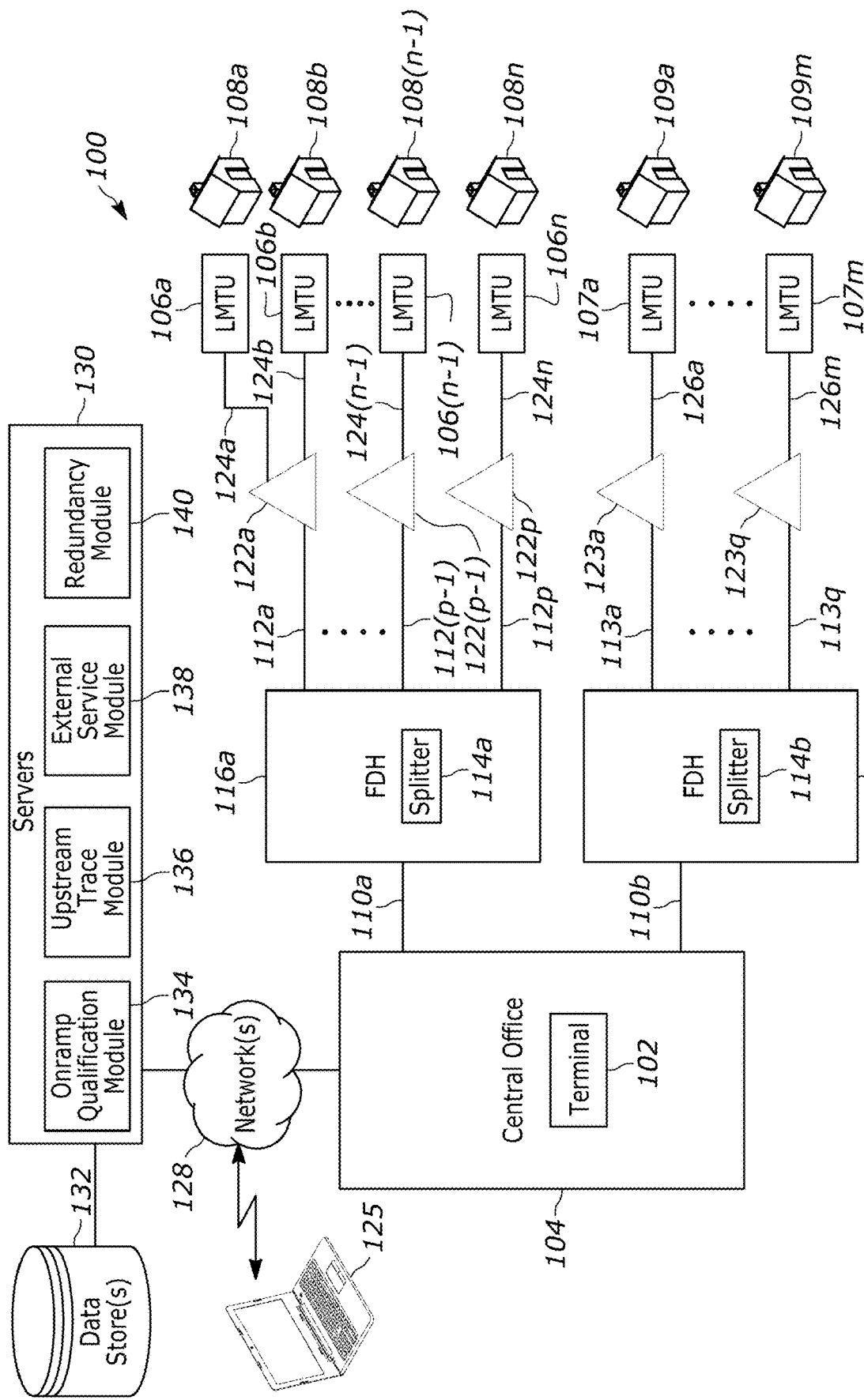
FIG. 1A illustrates a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Example Passive Optical Network (PON)

FIG. 1A is a block diagram of an example PON 100 in which the systems, methods, and techniques of the present disclosure may be implemented. The example PON 100 includes one or more pieces of network service equipment (e.g., terminals) such as optical line terminals (OLTs) (an example one of which is designated by reference numeral 102) at a central location (e.g., at a central office 104) connecting to one or more last mile termination units (LMTUs) 106a, . . . , 106n at respective customer premises 108a, . . . , 108n. Depending on the implementation, the one or more terminals may include OLTs for fiber cables, terminals for copper wiring, etc. In some implementations, the terminal 102 includes PON ports (e.g., 32 ports, 64 ports, 128 ports), each of which may correspond to a respective splitter (e.g., as detailed below) for connecting to the LMTUs by way of one or more distribution hubs and/or distribution terminals. As used herein, the term "termination unit" generally refers to a last mile termination unit (LMTU), which may be implemented by an optical network unit (ONU) or an optical network terminal (ONT), for example. The last mile termination units 106a, . . . , 106n may be located outside and/or inside the locations or customer premises 108a, . . . , 108n. In some examples herein, the term "optical terminal" generally and categorically refers to a last mile termination unit (e.g., an ONU or ONT) or to a terminal (e.g., an OLT). Further, it will be understood that, although the below topology and description refer to fibers in a fiber network (e.g., optical fibers in an optical fiber network), additional topologies (such as copper wires and/or digital subscriber lines (DSLs) in a copper network) and/or combinations of topologies (such as a hybrid optical fiber/copper wire network) are contemplated as well.

The example PON 100 is implemented using instances of point-to-multipoint topology. For example, in the example PON 100, a first feeder wire 110a from the terminal 102 (which may be and/or be referred to herein as an "F1 optical fiber 110a" or a "primary wire or fiber 110a") serves the one or more last mile termination units 106a, . . . , 106n via respective distribution optical fibers 112a, . . . , 112p (which may be and/or be referred to herein as "F2 optical fibers 112a, . . . , 112p" or "secondary fibers or wires 112a, . . . , 112p") and respective last mile optical fibers or wires 124a, . . . , 124n. In the illustrated example, the first feeder wire 110a is optically coupled to the plurality of last mile termination units 106a, . . . , 106n via an example one-to-many splitter 114a (e.g., an optical splitter), which is disposed, located, implemented, etc. in an example distribution hub 116a. In some arrangements, the distribution hub 116a is located within a geographic area (e.g., a neighborhood) such that the customer premises 108a, . . . , 108n are proximally close to the distribution hub 116a, and typically each of the customer premises 108a, . . . , 108n and respective last mile termination units 106a, . . . , 106n is disposed at a different signal distance from the distribution hub 116a. A "signal distance," as generally utilized herein, refers to a distance over which a signal (e.g., an optical signal) travels or is delivered. In further implementations, the distribution hub 116a, 116b may include a downstream-facing conduit (e.g., a conduit in the direction of locations serviced by the PON 100) receiving a number of fibers or wires (e.g., 124 wires, 248 wires, 596 wires, etc.). The wires may feed to various onramps 122a-122p of the PON 100 (also interchangeably referred to herein as "onramp facilities," "on-ramps," and/or "on-ramp facilities" 122a-122p of the PON 100) via a splitter 114a, 114b (e.g., each with 16 strands, 32 strands, 64 strands, etc.), and the onramps 122a-122p may optically or communicatively couple to the LMTUs 106a-106n via respective last mile fibers or wires 124a-124n.

In some implementations, the PON 100 may or may not include additional feeder wires, splitters, and onramps for a plurality of additional customer premises. Moreover, a PON may or may not include a plurality of distribution hubs. For example, as shown in FIG. 1A, the example PON 100 includes a second feeder or primary wire 110b from the terminal 102 that is coupled to another plurality of last mile termination units 107a-107m at respective customer premises 109a-109m via another many-to-one splitter 114b included in another distribution hub 116b, respective secondary wires 113a-113q, respective onramps 123a-123q, and respective last-mile optical fibers or wires 126a-126m.

Further, although not shown in FIG. 1A, the PON 100 may include any number of FDTs to provide additional point-to-multipoint connections within the PON 100. For example, the FDHs 116a, 116b may include one or more respective FDTs, one or more FDTs may be optically disposed between an FDH and one or more LMTUS, etc.

As utilized herein, the "components" or "optical components" of the PON 100 generally refer to the devices, nodes, and wires of the PON 100. For example, the components of the PON 100 shown in FIG. 1A may include the terminal 102; the distribution hubs 116a, 116b; the splitters 114a, 114b; the LMTs 106a-106n, 107a-107m; the onramps 122a-122p, 123a-123q; any number of FDTs (not shown), and the wires and/or fibers interconnecting the devices or nodes (e.g., the feeder wires or fibers 110a-110b, 112a-112p, 113a-113q, 124a-124n, 126a-126m).

In some scenarios, a terminal (e.g., the terminal 102 and/or one or more of the last mile termination units 106a-106n, 107a-107m) and/or one or more of the onramps 122a-122p, 123a-123q may transmit test signals and/or patterns, indication light, and/or other types of measurement signals into an optical fiber or wire in response to control signals received from a computing device. For example, the terminal 102, the one or more LMTUs 106a-106n, 107a-107m, and/or the one or more onramps 122a-122p, 123a-123q may receive control signals from a computing device 125 (e.g., a laptop, a computer, a tablet, a mobile phone, etc.) associated with a service technician or other agent of the PON 100, and may responsively generate and transmit test signals and/or patterns. In some examples, the computing device 125 controls a terminal and/or onramp of the PON 100 via one or more networks 128 (which may include one or more wired and/or wireless private networks and/or public networks, such as the Internet), and/or by direct interaction with the terminal/onramp (e.g., via a hotspot provided by the optical terminal/onramp, a service port of the optical terminal/onramp, etc., not shown in FIG. 1A). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole; generate alerts and alarms; initiate various actions; provide user interfaces, which may include graphical user interfaces (e.g., at the computing device 125); log, historize, and/or otherwise store data generated by and associated with the PON 100 (e.g., in one or more data stores 132); and the like. For example, one or more applications may execute at the server(s) 130 and/or the server(s) may host one or more services to provide management, administrative, and/or test functionalities of the PON 100. Additionally or alternatively, the computing device 125 may interact with the server(s) 130 using a mobile application, a web service call, a direct and wireless connection (e.g., as described above), a wired connection, etc. Measurements, other sensed data, and/or other types of results based on the transmitted test signals and/or patterns may be provided to the requesting computing device or server 125, 130.

In some implementations, the server 130, computing device 125, and/or other such electronic device may monitor bandwidth at the PON ports as well as at corresponding ports of the distribution hub, LMTUs, or other such terminals. In further implementations, the server 130 may determine to move a user from a particular port to another based on the bandwidth utilization and/or indications from a customer (e.g., a customer complaint, a user indication, a system determination, etc.).

Various information and data associated with, utilized by, and/or generated by the PON 100 may be stored in the data stores 132 of the PON 100. For example, the data store(s) 132 may store records of customer contact events with a technical support organization supporting the PON 100, customer service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the PON 100. Still further, the data store(s) 132 may store data indicative of the architecture, infrastructure, and component connectivity of the PON 100, including identifications of various PON components and indications of which PON components connect to which other PON components. In further implementations, the data store(s) may store other configuration data, e.g., as described herein. Of course, the data store(s) 132 may store any updates to any and all of the information and data stored therein.

Moreover, the data store(s) 132 include a distribution record representative of a particular distribution hub 116 (e.g., distribution hub 116a, distribution hub 116b, etc.), one or more ports in the distribution hub representative of one or more connections with termination units (e.g., LMTUs 106a, 106b, . . . , 106n), one or more splitters 114 (e.g., splitter 114a, splitter 114b, etc.) associated with the distribution hub 116, etc. Further, the distribution record may include additional information associated with users, such as associations between various ports in the distribution hub and various premises, GPS data for the various premises, a status and/or type of the connection to the premises, a PSI score, a wavelength ($\lambda$) and/or attenuation rate, an identifier (e.g., a premises ID, a termination unit ID, etc.), a serial number (e.g., of an optical network terminal (ONT)), etc. Similarly, the distribution record may otherwise include additional information as described and/or as otherwise associated with various implementations described herein.

The servers 130 may additionally store one or more modules for executing particular operations. For example, the servers 130 in the exemplary embodiment of FIG. 1A include any one or more of: an onramp qualification module 134, an upstream trace module 136, an external service module 138, a redundancy module 140, and/or any other such module performing functionality as described herein (e.g., with regards to FIGS. 2A and 5-7 below). It will be understood that, although each module is described as performing a particular function, fewer modules may perform the functionality as described herein. For example, a single combination module may perform the functionalities described as being performed by any or all of the onramp qualification module 134, the upstream trace module 136, the external service module 138, and/or the redundancy module 140. Further, it will be understood that, although the onramp qualification module 134, upstream trace module 136, external service module 138, and redundancy module 140 are depicted as being stored at the servers 130, in some embodiments at least portions of any of the modules may execute at the computing device 125 and/or in conjunction with execution at the servers (e.g., a client/server model, web service call, etc.).

In some implementations, the onramp qualification module 134 operates to determine or identify one or more onramps or onramp facilities (e.g., one or more onramps 122a-122p and/or 123a-123q, which may include candidate onramps and/or selected or designated onramps) for a service location (e.g., one or more of customer premises 108a-108n, 109a-109m) to connect to the PON 100. The service location may be a new service location, an existing, active service location at which a different set of services (e.g., end-user or customer services) is to be provided, or an existing inactive or deactivated service location at which end-user services are to be provided. As such, the service location may be generally referred to herein as a "prospect service location," a "prospective service location," or a "target service location." An "onramp," as utilized herein, generally refers to a network access point for the PON 100 or, said another way, to a set of devices and/or components configured to facilitate access to the PON 100. As such, "onramps" may be referred to interchangeably herein as "onramp facilities" and "onramp points." Generally speaking, onramps 122a-122p and/or 123a-123q of a PON 100 are facilities of the PON 100 which are fixedly disposed at respective physical locations or sites within the coverage areas and regions serviced by the PON 100. Typically, the onramps 122a-122p and/or 123a-123q include one or more types of devices, components, and/or hardware into which one or more optical fibers or wires of the PON 100 are received or are otherwise physically connected, thereby optically connecting the onramps 122a-122p and/or 123a-123q to the PON 100. For example, in the upstream direction (e.g., towards the central office 104), the onramp 122a receives primary fiber or wire 112a and the onramp 123q receives primary fiber or wire 113q. If and when desired, LMTUs may be physically connected to respective onramps. For example, as shown in FIG. 1A, LMTUs 106a, 106b are physically connected to onramp 122a via respective last mile fibers or wires 124a, 124b, and LMTU 107m is physically connected to onramp 123q via last mile fiber or wire 126m. Example types of onramp facilities of PONs include terminals (e.g., optical fiber drop terminals), splices and/or splice points (e.g., optical fiber splices), loops (e.g., optical fiber loops), cables (e.g., optical fiber cable trunks, such as F1 optical fiber cables), and/or other types of onramp facilities. Each onramp facility 122a-122p and/or 123a-123q of the PON 100 may be uniquely identified, within the PON 100, via a unique identifier such as an Onramp or Facility ID, and may be associated with other descriptive information such as the type of onramp, the status of onramp facility (e.g., in-service, pending, proposed, future), geospatial physical coordinates, nearest street and/or easement address, total number of ports, total number of available ports, etc. For example, such identifications and information that is descriptive of onramps may be stored in the data store(s) 132. Depending on the implementation, multiple customer premises 108a-108n may connect to a single onramp facility 122a-122p. For example, in the exemplary implementation of FIG. 1A, two customer premises 108a and 108b connect to a single onramp facility 122a via respective LMTUs 106a and 106b and respective last mile fibers or wires 124a, 124b.

In some implementations, the upstream trace module 136 operates to detect a physical (e.g., polyline) route within the PON 100 from an onramp facility (e.g., an onramp 122a-122p determined by the onramp qualification module 134 and/or corresponding to an LMTU 106a-106n) corresponding to a service location (e.g., one or more of customer premises 108a-108n) to a serving office (e.g., central office 104) of the PON 100.

In some implementations, the external service module 138 operates to analyze and determine qualifications of an external facility to the PON 100 to provide one or more services (e.g., end-user services) to a service location (e.g., one or more of customer premises 108a-108n).

In some implementations, the redundancy module 140 operates to determine one or more redundant connection schemes for a service location (e.g., for one or more of customer premises 108a-108n). Such connection schemes are generally referred to herein as "redundant" as the connection schemes are similar or identical (e.g., redundant) with respect to providing a set of required services (e.g., optical, network, and/or other types of end-user services) to a service location even though the connection schemes themselves may differ in one or more elements (e.g., different fibers, devices, components, terminals, physical polyline routes, offices, service providers, etc.). For example, the redundancy module 140 may operate to determine different or differing elements (e.g., redundant fibers, redundant devices or components, redundant terminals, redundant physical polyline routes, redundant offices, and/or redundant providers) across different physical polyline routes for the service location, so that services which are consumed at the service location may be maintained at the service location via the determined, different physical polyline routes.

Example Environment

Figure 1B:
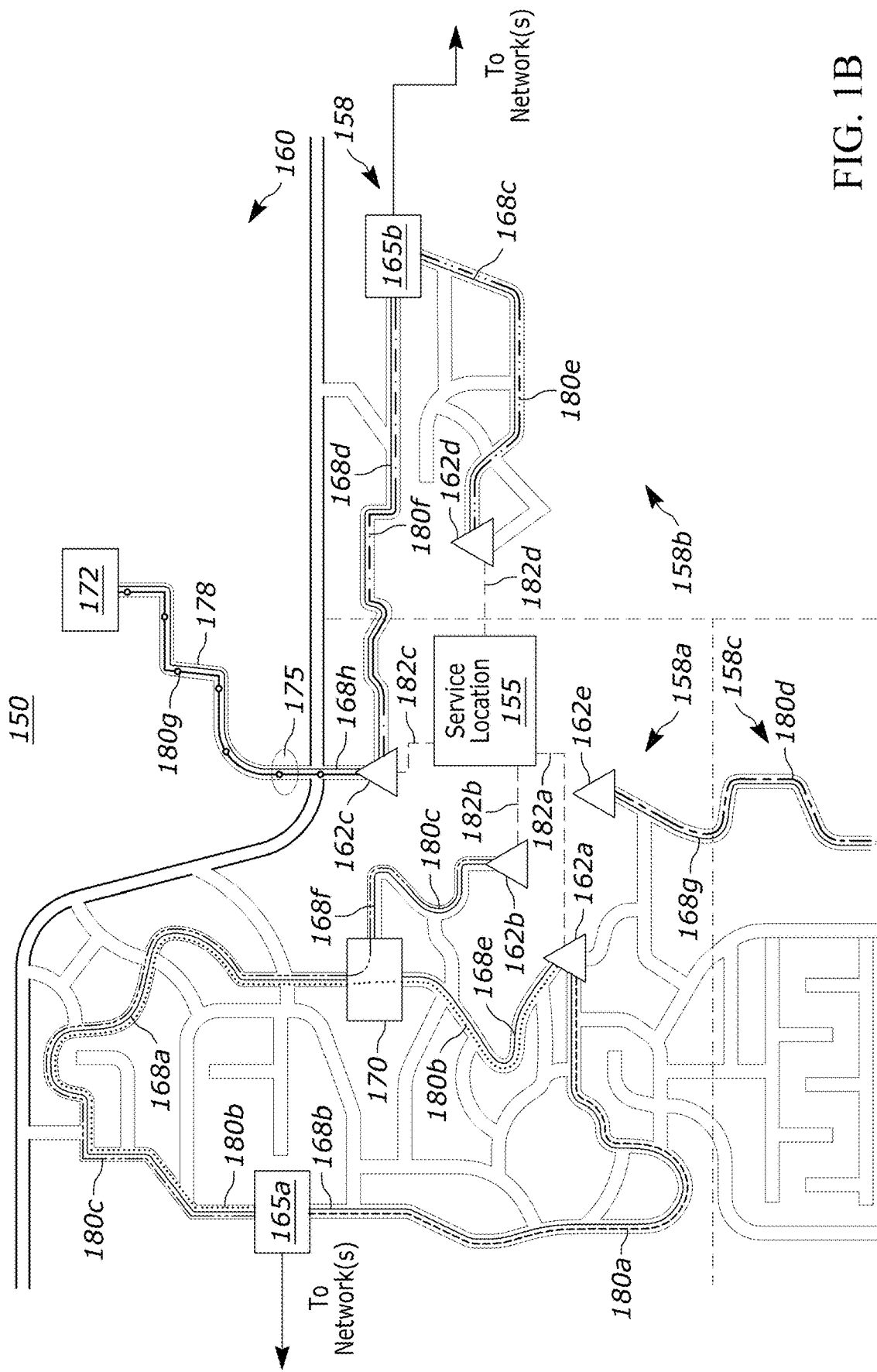
FIG. 1B illustrates a block diagram of an example environment in which a set of services is to be provided to a service location via a PON, such as the PON of FIG. 1A.

FIG. 1B is a block diagram of an example environment 150 in which a set of services (e.g., a set of required services such as end-user services) is to be provided to a service location 155 (e.g., a prospect service location 155) via a PON of a service provider of the PON. For example, the set of services may include optical and/or other types of services, and the service location 155 may be a location that is serviced by the service provider which provides the PON 100 of FIG. 1A and at which the set of services are to be consumed. For ease of illustration, and not for limitation purposes, FIG. 1B is described herein with simultaneous reference to FIG. 1A.

As depicted in FIG. 1B, in the example environment 150 the service location 155 is physically located within a first geographical service area 158 serviced by the PON service provider, where the first geographical service area 158 is delineated into three sub-areas or regions 158a, 158b, and 158c. As also depicted in FIG. 1B, in the example environment 150 the service location 155 is proximately located to a second geographical area 160 serviced by a service provider that is not the PON service provider. Accordingly, for ease of reading herein, the terms "PON service provider" or "service provider" are interchangeably used herein and generally refer to a service provider which provides services to service locations via a PON (e.g., the PON 100), and the term "external" service provider, as used herein, generally refers to a service provider other than the PON service provider. Depending on the implementation, the external service provider may be another PON service provider, another terrestrial communication network service provider, and/or any other such telecommunications provider. The term "terrestrial communication network" may refer to a PON, a copper network, and/or any other such network using terrestrial lines.

The service location 155 of the PON service provider may be an existing service location at which the set of required services is to be provided by the PON service provider, or the service location 155 may be a new service location at which the set of required services is to be provided by the PON service provider. For example, the service location 155 may include one or more of a residential, commercial, non-commercial (e.g., school, non-profit, governmental, etc.), or mixed-use (e.g., hybrid residential, non-commercial, and/or commercial) service location which is to be initially serviced by the service provider, or the service location 155 may include an existing residential, commercial, non-commercial, and/or mixed-use service location which is being reactivated or to which additional or changed services are to be provided by the service provider. The set of required services at the service location 155 may include, for example, an service via a particular wavelength band, a data communication service such as Internet service or calling services, a broadband service such as streaming services, and/or other types of services which are to be delivered to the service location via the PON for consumption at the service location 155. Typically, a customer corresponding to the service location 155 may specify or indicate the set of required services at the service location 155.

In the exemplary embodiment of FIG. 1B, the example environment 150 includes five different onramps 162a-162e of the PON located within the vicinity of prospect service location 155. In the example environment 150, onramps 162a, 162b, 162c, and 162e are physically located or disposed within the sub-area or region 158a serviced by the PON service provider, and onramp 162d is physically located or disposed within the sub-area or region 158b serviced by the PON service provider. Depending on the implementation, the onramps 162a, 162b, 162c, 162d, and 162e may be one of onramps 122a, . . . , 122(p–1), and 122p or 123a, . . . , and 123q of FIG. 1A.

Further in the exemplary embodiment of FIG. 1B, the geographical service area 158 of the service provider includes two serving offices 165a and 165b of the PON. Serving office 165a is physically located or disposed within sub-area 158a, and serving office 165b is physically located or disposed within sub-area 158b. Each serving office 165a, 165b may include one or more respective terminals (e.g., Optical Line Terminals or OLTs, not shown) via which services may be delivered via the PON to various service locations, for example, via respective optical fibers 168a, 168b, 168c, 168d, . . . , 168h. Additionally, each serving office 165a, 165b may include one or more network interfaces (not shown) via which the PON may communicatively connect with other networks external to the PON, such as the Internet, networks of other service providers, etc. For example, each serving office 165a, 165b, may be a different instance of the central office 104 shown in FIG. 1A and may be communicatively connected with the network(s) 128.

FIG. 1B further illustrates that the example environment 150 includes a fiber distribution hub (FDH) 170 optically connected to serving office 165a via the optical fiber 168a and optically connected to onramps 162a and 162b via respective optical fibers 168c, 168f. As such, the FDH 170 may include an optical splitter (not shown), the optical fiber 168a may be a primary or F1 optical fiber, and the optical fibers 168e, 168f may be secondary or F2 optical fibers. For example, the FDH 170 may be an instance of the FDH 116a or the FDH 116b of FIG. 1A. Still further, FIG. 1B illustrates that onramp 162c disposed in sub-area 158a of the PON is optically connected via optical fiber 168d to serving office 165b disposed in sub-area 158b of the PON, and onramp 162c of the PON is optically connected via optical fiber 168g to another serving office of the PON, which is disposed in the sub-area 158c but not shown in FIG. 1B.

Additionally, as depicted in FIG. 1B, the example environment 150 includes an external serving office 172 of the external service provider, where the external serving office 172 is disposed or physically located within the second geographical area 160 of the external service provider (e.g., externally with respect to the coverage area of the service provider of the PON). The external serving office 172 may provide data communication and/or broadband services to locations serviced by the external service provider (not shown in FIG. 1B) by using any suitable technology, such as optical networks, copper networks, cable networks, wireless networks, and/or the like (also not shown in FIG. 1B). As is shown in FIG. 1B, though, the external serving office 172 of the external service provider is communicatively connected via an inter-provider connector 175 to the onramp 162c of the PON provided by the service provider. As such, the PON optical fiber 168h received at the PON onramp 162c may be communicatively connected, via the inter-provider connector 175, to the communication media or transport mechanism 178 provided by the external service provider and communicatively connected to external serving office 172. For example, when the communication media/transport mechanism 178 of the external service provider is another optical fiber, the inter-provider connection 175 may include an optical connector, and when the communication media/transport mechanism 178 of the external service provider is a type of communication media or transport mechanism which does not support optical signals or transmissions (e.g., copper, cable, wireless, etc.), the inter-provider connection 175 may include a converter.

Thus, as depicted in FIG. 1B, the example environment 150 includes multiple candidate physical polyline routes 180a-180g via which the set of required services may possibly be provided by the service provider to the service location 155 via at least some components included in the PON of the service provider. For example, a first candidate physical polyline route 180a may include the onramp 162a, the optical fiber 168b, and the serving office 165a of the PON. A second candidate physical polyline route 180b may include the onramp 162a, the secondary optical fiber 168e, the FDH 170, the primary optical fiber 168a, and the serving office 165a of the PON. A third candidate physical polyline route 180c may include the onramp 162b, the secondary fiber 168f, the FDH 170, the primary optical fiber 168a, and the serving office 165a of the PON. A fourth candidate physical polyline route 180d may include the onramp 162e, the optical fiber 168g, and the other serving office of the PON, which is located within the sub-area 158c and not shown in FIG. 1B. A fifth candidate physical polyline route 180e may include the onramp 162d, the optical fiber 168c, and the serving office 165b of the PON, all of which are located within the sub-area 158b adjacent to the sub-area 158a in which the service location 155 is disposed. A sixth candidate physical polyline route 180f may include the onramp 162c located in sub-area 158a of the PON, and the optical fiber 168d and serving office 165b located in sub-area 158b of the PON. A seventh candidate physical polyline route 180g may be via the onramp 162c and optical fiber 168h of the PON, the inter-provider connector 175, and the communication media/transport mechanism 178 and serving office 172 of the external service provider.

It is noted that each of the candidate physical polyline routes 180a-180g are described as being "physical polyline" routes, as each of the routes include multiple lines or segments of physical communication media or transmission mechanisms. For example, while the primary optical fiber 168*a* is depicted in FIG. 1B as a single, logical primary optical fiber, in its physical implementation the primary optical fiber 168*a* may include multiple (e.g., "poly") physical segments of optical fibers that are sequentially connected to enable the optical path provided by logical optical fiber 168*a* to curve, bend around corners, and otherwise be contoured as required by the physical contours of streets and/or casements via and/or next to which the optical fibers are installed. As such, it is understood that each of the optical fibers 168*a*-168*g* depicted in FIG. 1B are logical depictions, as each may include multiple, different physical segments or lines of physical communication media or transmission mechanisms as required.

It is further noted that each of the physical polyline candidate routes 180*a*-180*g* are described as being "candidate" physical polyline routes, at least because although such physical polyline routes may exist between the onramps 162*x* (which are proximally-located with respect to the service location 155) and different serving offices, one or more of the candidate physical polyline routes may or may not be able to sufficiently support the set of services required at the service location 155.

Generally speaking, as will be described in more detail elsewhere herein, the techniques described in this disclosure, either alone or in combination, allow the PON system to determine or detect (e.g., automatically determine or detect) one or more candidate physical polyline routes between on-ramps which are proximally-located to a service location and a serving office, and/or to determine or detect (e.g., automatically determine or detect) one or more components of the candidate physical polyline routes for servicing the service location. The techniques may include selecting or designating (e.g., automatically selecting or designating) one or more of the detected candidate routes and/or components thereof (e.g., as primary and/or redundant routes and/or components) for providing the set of required services at the service location, and causing the set of required services to be provided to the service location via the selected or designated routes and/or components.

Figure 2A:
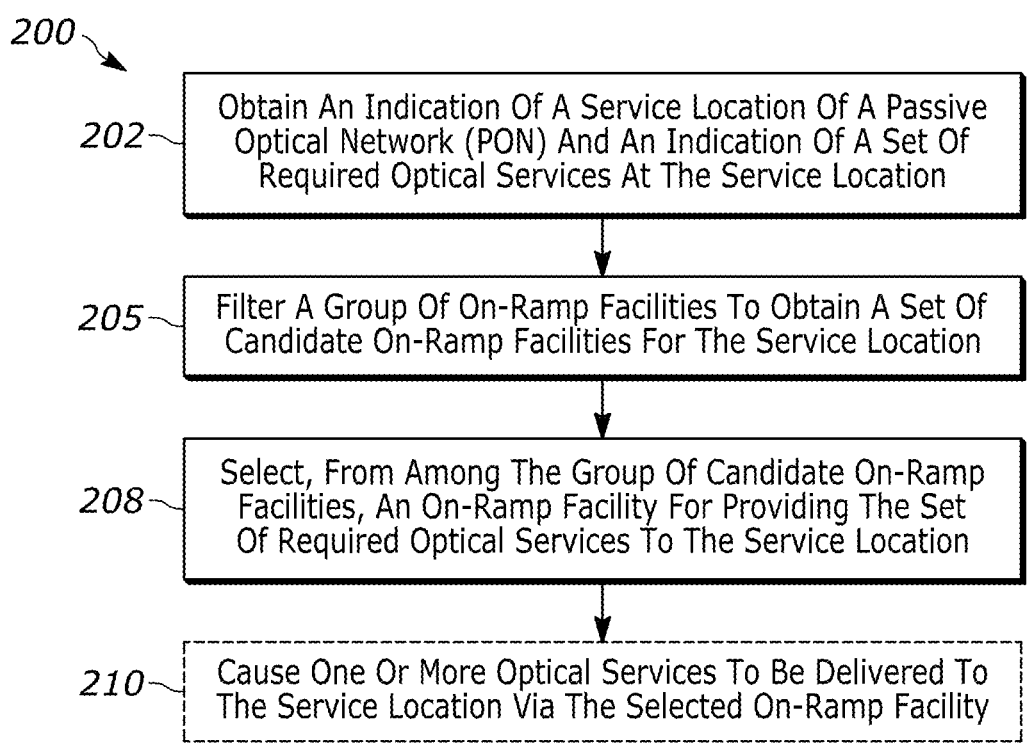
FIG. 2A depicts a flow diagram of an example method for qualifying onramps for a service location of a PON, such as the PON of FIG. 1A.
Figure 2B:
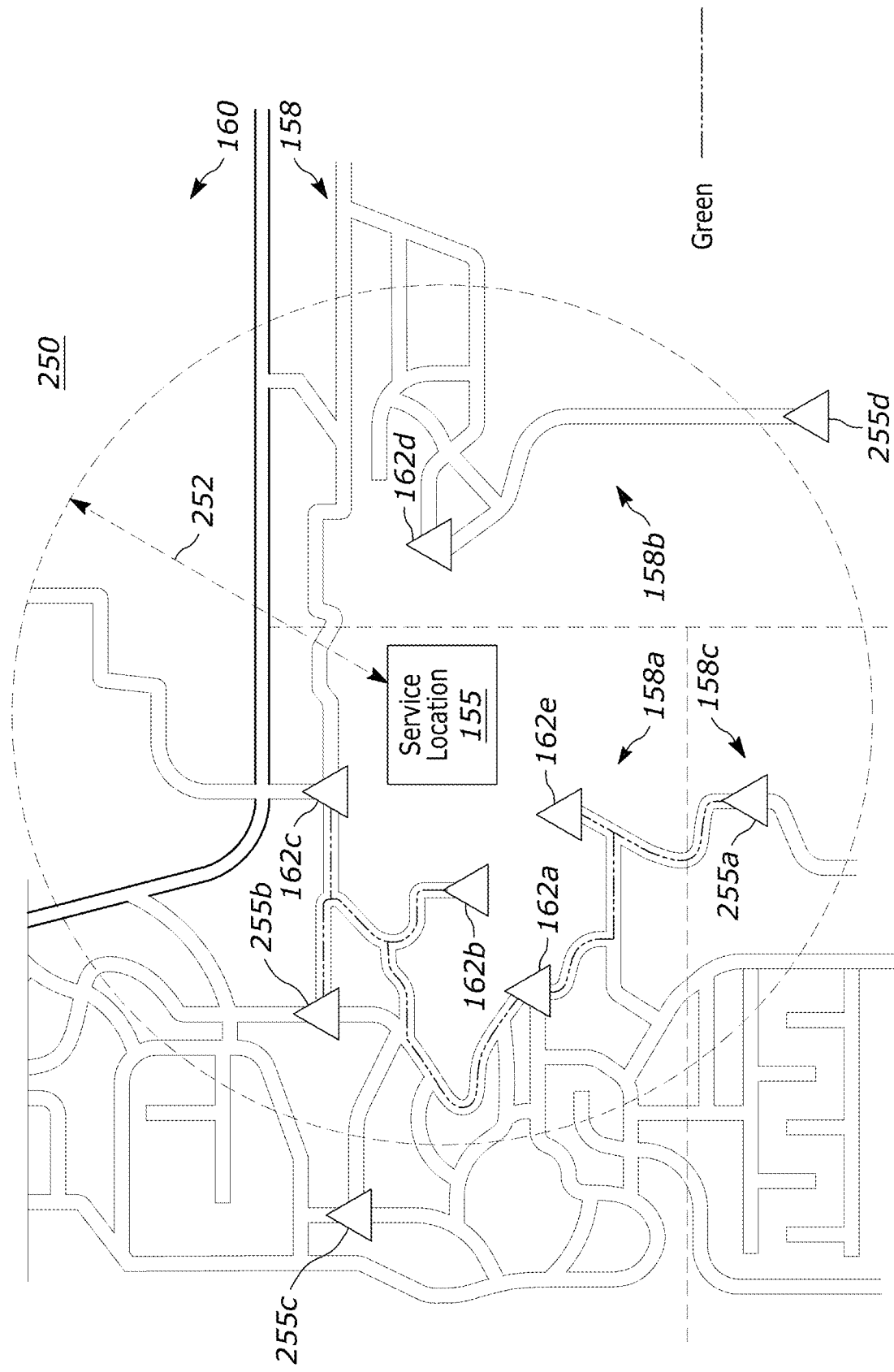
FIG. 2B depicts an example scenario in which an embodiment of the example method of FIG. 2A is utilized to qualify onramps for a service location of a PON.

FIGS. 2A and 2B relate to qualifying onramps of a PON for a service location of the PON. For clarity of discussion and clarity of illustration, and not for limitation purposes, FIGS. 2A and 2B are discussed simultaneously herein and with simultaneous reference to FIGS. 1A and 1B.

FIG. 2A depicts a flow diagram of an example method 200 for qualifying onramps for a service location of a PON, such as the PON 100 of FIG. 1A. In an embodiment, at least a portion of the method 200 of FIG. 2A may be executed by the onramp qualification module 134 of the PON 100. However, it is understood that the any one or more portions of the method 200 may be executed by other modules and/or components of the PON 100, and/or in PONs other than the PON 100. Additionally, in embodiments, at least a portion of the method 200 may operate in conjunction with at least a portion of one or more other methods described herein. Further, in some embodiments, the method 200 may include additional and/or alternate blocks other than those depicted in FIG. 2A.

FIG. 2B depicts an example scenario 250 in which an embodiment of the method 200 of FIG. 2A is utilized to qualify onramps for the example service location 155 within the environment 150 of FIG. 1B. Generally speaking, "qualifying" onramps relates to detecting or determining candidate onramps or candidate onramp facilities via which a service location may connect to a PON and via which the PON is able to provide a set of required services (e.g., a set of required services) to the service location. The set of services required at the service location is typically specified by the customer corresponding to the service location, and may include one or more services such as streaming, broadband services (e.g., broadband Internet services), other types of data communication services, etc. Different services may be provided by a serving office to the service location over the PON via different wavelength bands and may require respective different filters, optical fibers, and/or other optical components in order for the services to be delivered from the serving office to the service location. For service provider networks which comprise one or more different delivery technologies (such as a service provider network which utilizes optical networking technology and/or least one other type of network technology such as copper, DSL, Ethernet, packet, etc.), delivery of such services may require respective specific components within each different technological portion of the service provider network in order for the services to be delivered from a serving office of the service provider network to the service location.

The service location 155 at which the set of required services is to be provided may include one or more residential, commercial, non-commercial, and/or mixed-use service locations. For example, the service location 155 may be a single-family residence, a building which includes both commercial and residential locations, an industrial use building, a multi-unit residential building, a school dormitory, a governmental building with different offices, etc. Further, the service location may be a new service location of the PON, or the service location may be an existing service location whose onramp(s) are in need of (re) qualification. For example, at an existing service location, a new service which is being added may require a different onramp (e.g., due to the lack of necessary networking and/or component technology at or available via the present onramp) for delivery of the new services, or the existing service location may have been deactivated (or otherwise not being used) and is being reactivated for service.

Turning to the method 200 of FIG. 2A, at a block 202, the method 200 may include obtaining an indication of a service location 155 and an indication of a set of required services to be provided by the PON at the service location. The indication of the service location may be, for example, a mailing or street address or an indication of a geographical location (e.g., geospatial coordinates or other type of indication of the geographical location of the service location) at which the set of required services is to be provided. The indication of the service location and the set of required services may be obtained via any suitable means, e.g., via user input, from a database or file, from another computing device and/or application, and/or the like.

At a block 205, the method 200 may include filtering, based on the geographical location of the service location 155, a set (e.g., a group) of on-ramp facilities of the PON to identify or obtain a set of candidate on-ramp facilities for the service location, where each candidate on-ramp facility of the group is optically connected to a respective serving office via a respective physical polyline route within the PON 100. In an embodiment, the filtering 205 may be based on the geographical location of the service location. For example, the filtering 205 may include filtering a set (e.g., a group) of onramp facilities of the PON based on the geospatial coordinates of the service location. Referring to the example scenario 250 of FIG. 2B to illustrate, the onramp facilities within a predetermined radial distance r (e.g., as represented by reference 252 in FIG. 2B) of the service location 155 (e.g., as represented by the geospatial coordinates of the service location 155 and/or by any other suitable location indication) may be determined by filtering 205 the group of onramp facilities located within the sub-areas 158a, 158b, 158c of the PON 100 based on respective geographical locations of the group of onramp facilities (which may be indicated or determined, for example, by the onramp facilities' proximities to mailing or street addresses, and/or by respective geographical locations of the onramp facilities such as geospatial coordinates or other type of indication of the onramp facilities' geographical locations). In some implementations, the filtering 205 of the set of on-ramp facilities to identify at least some of the onramp facilities within the radial distance r (reference 252) of the service location 155 may be determined by utilizing a geographical mapping (e.g., a street, graphical, and/or network map and/or data representative thereof, such as a data table or data file) of the areas surrounding the service location 155 to determine relative locations of onramp facilities with respect to the service location 155, such as depicted in FIG. 2B. The mapping(s) may be stored in the data store 132 of the PON 100, for example. In some implementations, the filtering 205 of the set of on-ramp facilities to identify at least some of the onramp facilities within the radial distance r (reference 252) of the service location 155 may be determined by calculating respective straight-line distances (e.g., "as the crow flies") between geospatial coordinates of the service location 155 and the respective geospatial coordinates of some of the onramp facilities. The respective geospatial coordinates of at least some of the onramp facilities of the PON may be stored in the data store 132 of the PON, or may be obtained (e.g., may be obtained in-line in conjunction with the execution of the method 200) from one or more onramp facilities, for example. Of course, other techniques for the filtering 205 of the set of on-ramp facilities based on a predetermined radial distance r (reference 252) from the geospatial coordinates of the service location may be utilized in addition to or in place of the techniques described above.

In the example scenario 250, the filtering 205 has resulted in seven onramp facilities being identified as being located within the radius r (reference 252) of the service location 155, e.g., onramps 162a, 162b, 162c, 162d, 162e, 255a, and 255b, and thus the seven identified onramp facilities are included in the set of candidate onramps for the service location 155. Onramps 255c and 255d are located outside of the radial distance r (reference 252) and thus are excluded from the set of candidate onramps for the service location 155. A maximum number of candidate onramps and/or the radius r may be pre-specified and may be modifiable as needed for different service locations. Additionally or alternatively, the radius r (reference 252) may be variable. For example, the filtering 205 to determine candidate onramps may expand if the filtering 205 is unsuccessful with a smaller radius (e.g., if the filtering 205 results in no onramp facilities within a radius of 5 yards, the radius r may expand to 10 yards, etc.), and the filtering 205 to determine candidate onramps may contract (e.g., by reducing the radius r) if the search returns too many candidates (e.g., a number of candidates greater than a maximum threshold of total number of candidates).

In some embodiments, the set of candidate onramp facilities for the service location 155 may be additionally or alternatively filtered 205 from the set or group of on-ramp facilities of the PON 100 based on the set of required services at the service location 155. That is, if an on-ramp facility and its corresponding physical polyline route do not have the optical components, bandwidth, capacity, and/or other characteristics necessary to support the delivery of the set of required services to the service location 155, the on-ramp facility is excluded from the set of candidate onramp facilities for the service location 155. For example, the filtering 205 may be based on respective characteristics of respective physical polyline routes optically connecting each on-ramp facility to a respective serving office of the PON 100. The characteristics of the respective polyline routes may include, for example, respective optical components and/or types of optical components included in each physical polyline route (e.g., so that each candidate physical polyline route includes the necessary optical and/or non-optical components for providing the set of required services, such as previously described), available and/or predicted availability, bandwidth, capacity, and/or utilization of each physical polyline route, types of services supported by each physical polyline route, respective total distance between the service location and the respective onramp of each physical polyline route (e.g., via roads, casements, or other jurisdictionally-approved pathways via which optical fibers may be laid or otherwise installed), respective case of access (e.g., for laying or installing optical fibers) from the service location 155 to the respective onramp of each physical polyline route, to name a few. For example, when the filtering 205 is based on available and/or predicted bandwidth and/or capacity of respective physical polyline routes of the group of onramp facilities, those onramp facilities which are not able to support (and/or are which are predicted to be not able to support) the set of required services at the service location 155 in accordance with one or more specified performance criteria may be excluded from the set of candidate onramp facilities for the service location 155.

Indeed, in some implementations, the method 200 may include detecting and/or otherwise determining one or more characteristics of the respective physical polyline routes of the candidate onramp facilities for the service location 155. In some embodiments, the method 200 may operate in conjunction with the method 500 for performing an upstream trace operation and/or with other techniques described herein to detect or otherwise determine one or more characteristics of the respective physical polyline routes of the candidate onramp facilities for the service location 155. At any rate, to detect or otherwise determine one or more characteristics of the respective physical polyline routes of the candidate onramp facilities for the service location 155, the method 200 may include sending a test signal from a serving office to an on-ramp facility and/or sending a test signal from an on-ramp facility to a serving office (e.g., to detect the presence of various components within the physical polyline routes); measuring current bandwidth and/or capacities of physical polyline routes; and/or measuring or detecting other characteristics of physical polyline routes by physically utilizing components and/or testing equipment of the PON 100 to thereby determine one or more characteristics of the respective physical polyline routes of the candidate onramp facilities for the service location 155. Additionally or alternatively, the method 200 may include determining or otherwise detecting one or more characteristics of the respective physical polyline routes of the candidate onramp facilities for the service location 155 by obtaining information from various data stores associated with the PON 100 (e.g., data store 132), where such data stores may store mappings and/or locational information of streets, casements, street addresses, and/or other pathways; historical usages (e.g., bandwidths, capacities, etc.) of different physical polyline routes and/or various optical segments of the different physical polyline routes (e.g., over time, for a predetermined time period, etc.); historical costs of access and/or installation of PON components for physical polyline routes (e.g., financial costs, time costs, etc.); planned buildouts, replacements, reconfigurations, and/or removals of optical components, optical fibers, and/or interconnections within the PON; customer records; network configuration and/or performance data; and the like. In some situations, the method 200 may include detecting or otherwise determining one or more characteristics of the respective physical polyline routes of the candidate onramp facilities for the service location 155 by predicting one or more characteristics of physical polyline routes based on historical data, such as obtaining predicting future usages (e.g., bandwidths, capacities, etc.) of physical polyline routes. Of course, other suitable techniques for detecting or otherwise determining one or more characteristics of the respective physical polyline routes of the candidate onramp facilities for the service location 155 are possible and may be utilized by the method 200.

At a block 208, the method 200 may include selecting, from among the group of candidate on-ramp facilities, an on-ramp facility for providing the set of required services to the service location, where the selection may be based on the set of required services at the service location. Generally speaking, the selected on-ramp facility may have the characteristics (e.g., components and/or equipment, bandwidth/availability, etc.) to support the set of required services at the service location. In some cases, the selected on-ramp facility may be selected based on additional or alternate criteria, such as cost, case, and/or total round-trip easement or pathway distance of installation. For instance, the selecting 208 of the on-ramp facility for the service location may include selecting the on-ramp facility based on one or more characteristics of the respective physical polyline route of the each candidate on-ramp facility and/or based on a respective round-trip easement distance between the service location and each candidate on-ramp facility included in the group of candidate on-ramp facilities. As such, in embodiments, the method 200 may include determining the respective round-trip easement distance of the each candidate on-ramp facility based on a geographical mapping and/or based on respective geospatial coordinates of the service location and each candidate on-ramp facility. In embodiments, the selecting 208 of the on-ramp facility for the service location may include selecting the on-ramp facility based on at least one of user input or one or more pre-defined characteristics of on-ramp facilities and/or associated with on-ramp facilities. Examples of pre-defined characteristics may include optical and/or non-optical components; types of optical and/or non-optical components; physical, technical, and/or operational characteristics; identities of respective service provider providing the on-ramp facilities; default settings; limits and/or ranges of conditions associated with the on-ramp facilities; and the like.

In some situations, multiple candidate onramp facilities may have the preferred characteristics for servicing the service location 155. In these situations, the method 200 may include selecting 208 the onramp facility for providing the set of services to the service location based on a particular characteristic or criteria (which may be pre-defined) and a threshold or target value or level of the particular characteristic or criteria (which may be pre-defined). For example, the cost of installation, the round-trip distance of installation, etc. with respect to corresponding thresholds or targets may be the basis for selecting from among the multiple candidate onramp facilities having the preferred characteristics for servicing the service location 155.

In some situations, multiple candidate onramp facilities may be ranked based on respective suitabilities of the candidate onramp facilities for servicing the service location 155, where the suitabilities may be based on one or more predefined or specified characteristics or criteria and/or corresponding thresholds, and the selecting 208 of the onramp facility may be based on the rankings. In some situations, the selecting 208 may include selecting multiple candidate onramp facilities for the service location 155. For example, one onramp facility may be selected to be a primary onramp facility for the service location 155, and other onramp facilities may be selected to be a secondary or backup onramp facility for the service location 155 (e.g. based on one or more predefined or specified characteristics and/or thresholds). Indeed, in some embodiments, the method 200 may operate in conjunction with the method 700 and/or other techniques described herein to provide redundancy at the service location 155.

At a block 210, the method 200 may include causing one or more services (e.g., one or more optical and/or other types of services) to be delivered from a serving office of the PON to the service location 155 via the selected on-ramp facility. For example, the method 200 may include, upon the selecting 208 the on-ramp facility, sending an instruction to configure and optically connect the on-ramp facility to an LMTU (not shown in FIG. 2B) associated with the service location 155. For instance, if the service location 155 is a deactivated service location, the method 200 may include sending an instruction to the servers 130 and/or to a technician computing device 125 to initiate reactivation and diagnostic testing of the optical connection between the LMTU associated with the service location 155 and the selected onramp facility, as well as the physical polyline routes from the selected onramp facility to corresponding serving offices. If the service location 155 is a new service location, the method 200 may include sending an indication of the selected onramp facility and a work order to initiate the installation of an optical connection between the LMTU associated with the service location 155 and the selected onramp facility. In some embodiments, the block 210 may include sending an instruction to the serving office(s) and/or any intermediate components which are optically disposed between the serving office(s) and the selected onramp to provide (and/or to initiate the providing of) the one or more services to the LMTU associated with the service location 155.

Of course, in embodiments, the onramp qualification module 134 may execute multiple instances of at least a portion of the method 200, e.g., in parallel and/or sequentially for different service locations. As such, in an embodiment, the method 200 may further include obtaining an indication of a second service location of the PON and an indication of a second set of required services at the second service location, filtering the set of on-ramp facilities of the PON (e.g., based on any one or more filtering criteria such as those previously described) to obtain a second group of candidate on-ramp facilities for the second service location, and selecting from among the second group of candidate on-ramp facilities for the second service location, a second on-ramp facility for providing the second set of required services to the second service location, where the selecting of the second on-ramp facility may be based on any one or more selection criteria, such as those previously described. In this embodiment, the method 200 may include assigning the selected second on-ramp facility to the second service location for providing the second set of required services to the second service location via the PON. An indication of the assignment may be stored in a data store of the PON 100 and/or may be provided to a user interface and/or to another application associated with the PON, for example. Optionally in this embodiment, the method 200 may further include causing at least one service to be delivered from a respective serving office of the PON to the second service location via the selected second on-ramp facility, e.g., in manners similar to those described elsewhere herein.

Figure 3:
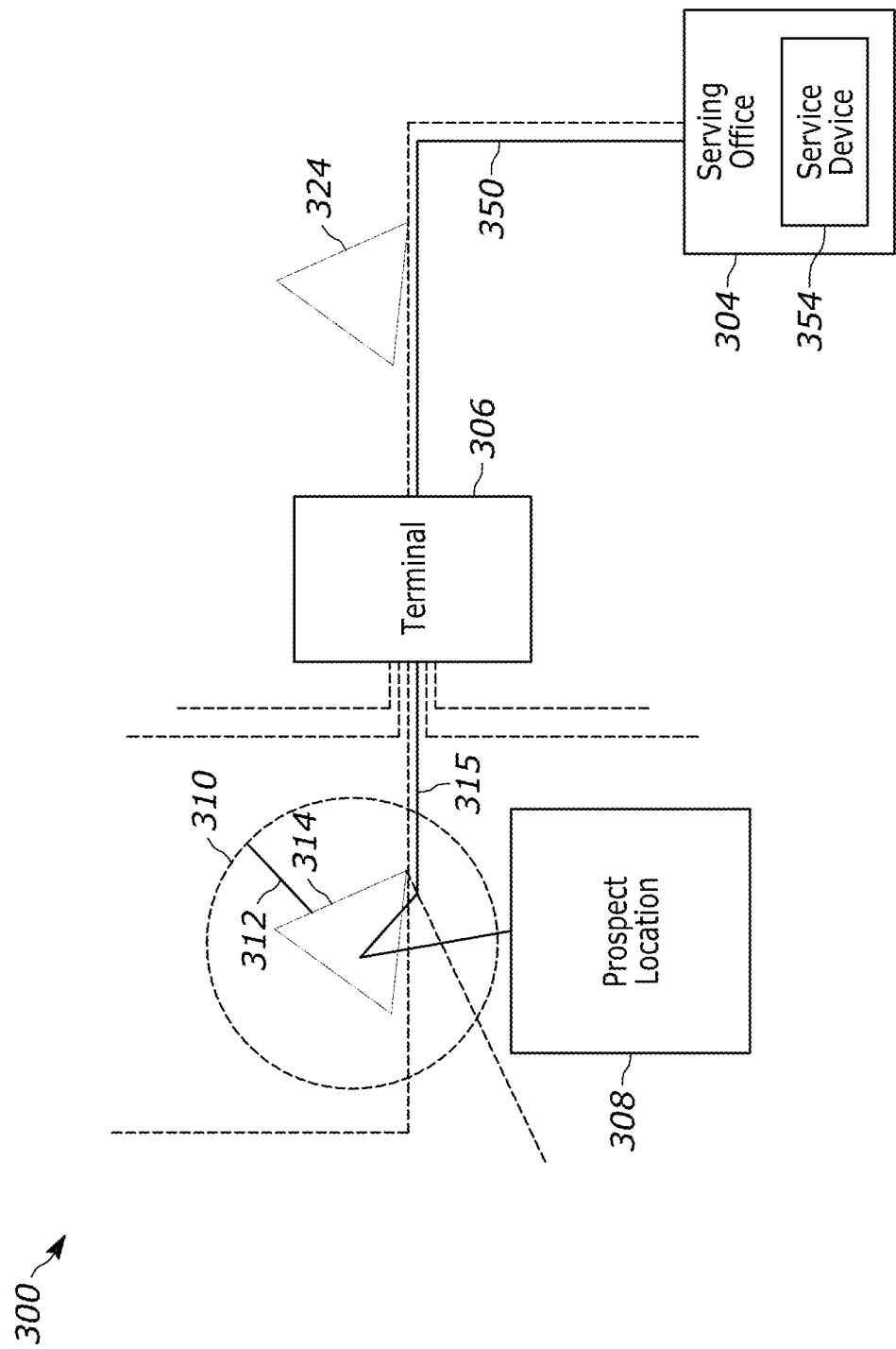
FIG. 3 illustrates an exemplary network for performing a fiber upstream trace operation that may be in and/or part of the PON of FIG. 1A.

FIG. 3 illustrates a block diagram of an example upstream trace network 300, implemented in a PON (e.g., PON 100 of FIG. 1A).

In particular, a computing device (e.g., computing device 125) traces a cable connection 350 via which a serving office 304 may provide network capabilities to a prospect location 308. In particular, the computing device 125 determines a nearest splice point or onramp 314 to the prospect location 308 through which the prospect location 308 can connect to an existing cable connection (e.g., cable connection 350). In some implementations, the computing device 125 determines the nearest splice point 314 through an on-ramp qualification process as described with regard to FIGS. 2A and 2B above. In some such implementations, the computing device 125 determines a geographic location (e.g., latitude and longitude) for the prospect location 308, and determines a nearest splice point 314 as described above with regard to FIGS. 2A and 2B. It will be understood that, although the disclosure herein refers to techniques performed with regard to the nearest splice point 314, in further implementations, the computing device 125 determines to use a further splice point 324 (e.g., if the nearest splice point 314 belongs in an external provider network as described below with regard to FIGS. 4A and 4B, for redundancy purposes as described below with regard to FIG. 5, if the further splice point 324 provides a shorter buildable route, etc.).

The computing device 125 then determines a nearest polyline 315 (e.g., part of the cable connection 350) in the PON through which the prospect location 308 is to connect to the serving office 304. In some implementations, the computing device 125 uses a lookup radius 312 to determine a search area 310 in which the computing device 125 searches for the nearest polyline 315 in the PON. Depending on the implementation, the lookup radius 312 may be 5 feet, 10 feet, 50 feet, etc. In some implementations, the lookup radius 312 may be variable and/or may expand if a search is unsuccessful with a smaller radius (e.g., if a search finds nothing at with a radius of 5 feet, the search may expand to 10 feet, etc.). In some implementations, the computing device 125 performs the search for the nearest polyline 315 through one or more databases associated with the PON (e.g., data store(s) 132). In further implementations, the computing device 125 may use the longitude and/or latitude of the nearest splice point 314 to determine a nearest polyline 315. In further implementations, the computing device 125 uses other such techniques for detecting the nearest polyline 315 (e.g., analysis of past historical records from the splice point, analysis of polyline capabilities for nearest polyline 315, etc.). as described herein.

The computing device 125 may then associate the nearest splice point 314 with the detected polyline 315 in one or more stored records. Further, the computing device 125 may additionally trace through the detected polyline 315 to any terminals (e.g., terminal 306), previous splice points (e.g., splice point 324), previous strands of fiber, etc. through to the serving office 304. Similarly, the computing device 125 may then store the results of the trace in one or more stored records. In some implementations, the computing device 125 traces through the detected polyline 315

In some implementations, the computing device 125 searches one or more datasets (e.g., in a database such as data store(s) 132 of FIG. 1A) to trace inventory back from a terminal 306, a splice point 314, 324, a prospect location 308, etc. Depending on the implementation, the computing device 125 determines a nearest splice point 314, a nearest polyline, etc. from the data store(s) 132 in addition to or in place of the techniques described above. In further implementations, the computing device 125 uses the data in the data store(s) 132 to generate a complete path of the connecting network from the access point (e.g., the nearest splice point 314) and/or prospect location 308 to the particular serving office 304. In some implementations, the computing device 125 determines a particular service device 354 and/or equipment in the serving office 304 that manages the network for the prospect location 308. Depending on the implementation, the computing device 125 stores an association between the prospect location 308, the nearest splice point 314, the serving office 304, and/or the particular service device 354 and/or equipment indicative of a relationship between the component elements.

In further implementations, the computing device 125 determines a current usage of resources on the PON at the serving office 304, via the connection 350, via a particular splice point 314, 324, via a particular service device 354, etc. Depending on the implementation, the computing device 125 may determine whether the serving office 304 can support adding the prospect location 308 via the polyline 315 at the splice point 314 and/or whether to connect the prospect location 308 to another polyline on the network connection 350. Depending on the implementation, the computing device 125 may make such a determination based on congestion in the network, total provisioned capacity, presence (or lack thereof) of small form factor pluggable devices to support one or more services and/or speeds to be provided to the prospect location 308, etc. For example, if the prospect location 308 is to be provided with fiber service, the computing device 125 may determine if the terminal 306, an OLT (not shown), the splice point 314, and/or the serving office 304 has equipment to provide fiber service. Similarly, the computing device 125 may analyze and/or determine whether a gateway router (e.g., associated with the service device 354, serving office 304, terminal 306, splice point 314, prospect location 308, etc.) is sufficient and/or supports the service in question to be provided.

Figure 4A:
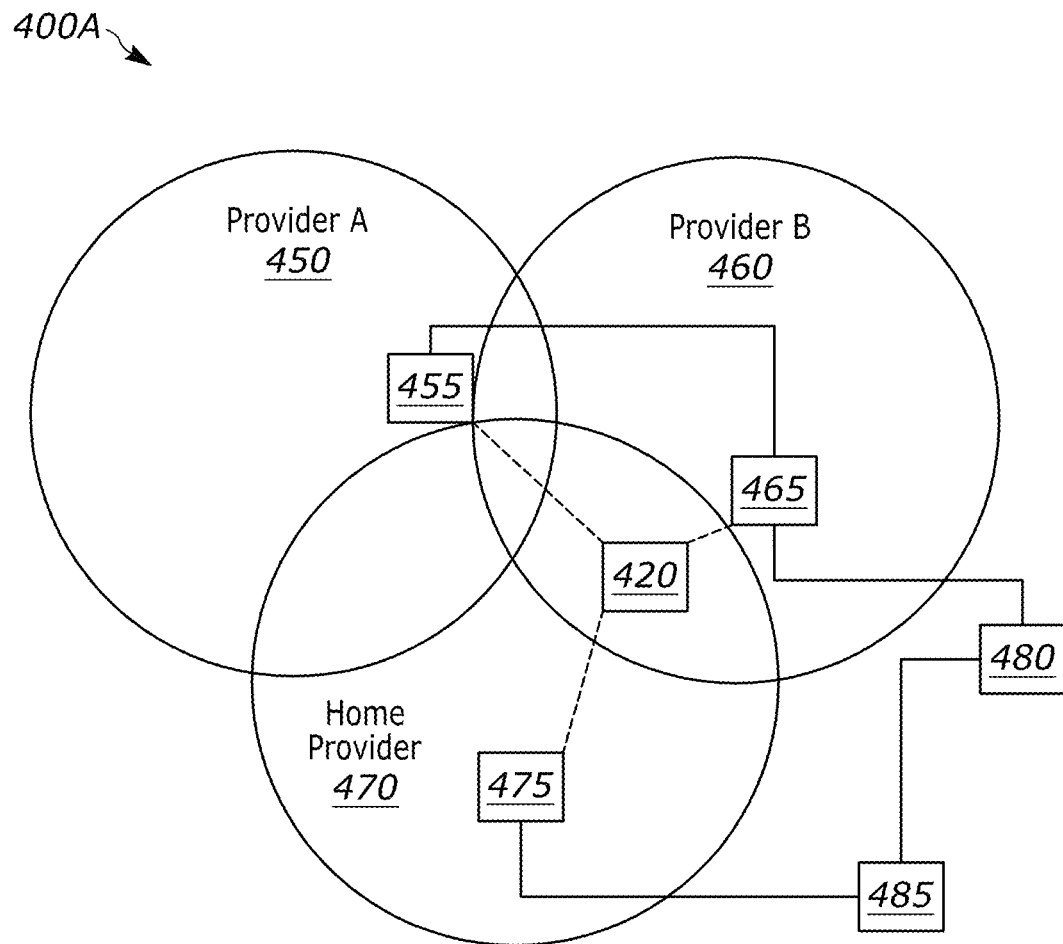
FIG. 4A illustrates an exemplary network of an PON network provider maintaining a PON such as the PON of FIG. 1A and other external network providers, each of which is a candidate for providing network services to a prospective service location.
Figure 4B:
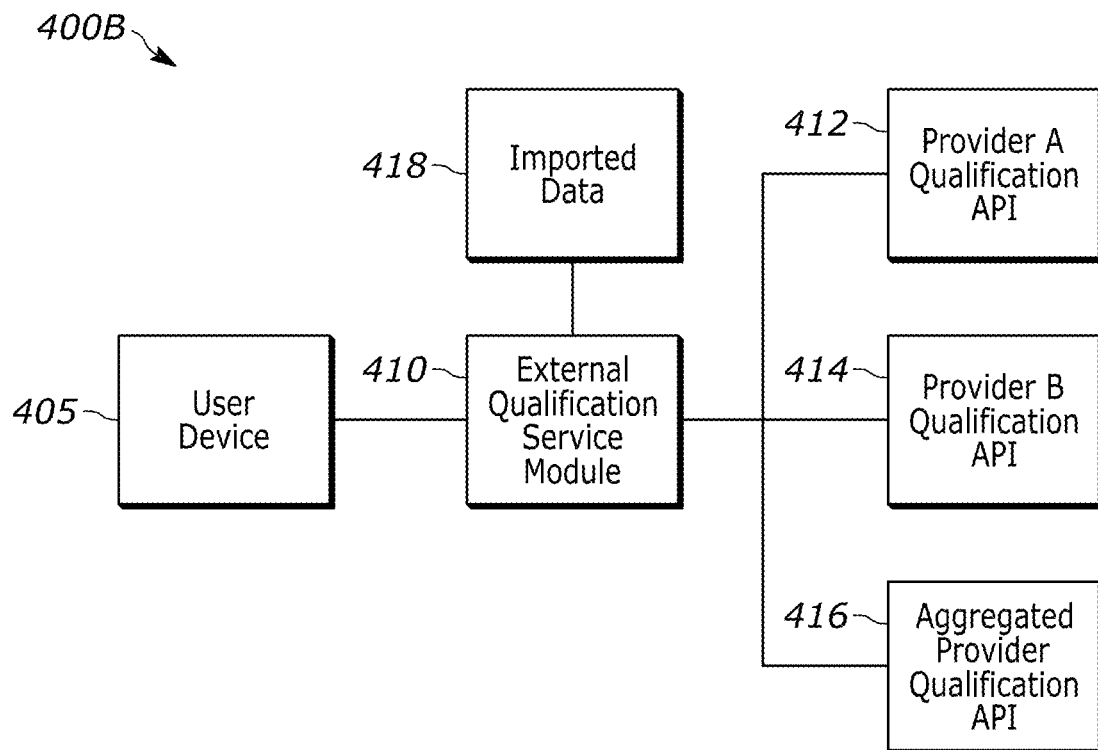
FIG. 4B illustrates an exemplary block diagram of an example system for interfacing with one or more external network provider devices to gather and analyze data related to potential network services for a prospective service location.

FIGS. 4A and 4B illustrates block diagrams of an example external qualification network 400A, implemented in a PON (e.g., PON 100 of FIG. 1A), and an example external qualification system 400B.

In particular, a computing device (e.g., computing device 125) aggregates multiple provider service qualification results into a common model that captures capabilities for a given geographic point or address location. For example, in the exemplary embodiment of FIG. 4A, a prospect location 420 is located near three onramp splice points 455, 465, and 475. While each of the splice points 455, 465, and 475 are options for the prospect location 420, each is located within range of one of three providers. In particular, splice point 455 is located within a first range 450 of Provider A, splice point 465 is located with a second range 460 of Provider B, and the splice point 475 is located within a third range 470 of the home provider. In some implementations, each of the splice points 455, 465, and 475, along with additional splice points 480 and 485, are part of the same PON as maintained by the home provider. In further implementations, each of the splice points 455, 465, and 475 is maintained by a respective provider in the range in which the splice point is located (e.g., Provider A for the first range 450, Provider B for the second range 460, and the home provider for the third range 470, respectively). In still further implementations, each of the splice points 455, 465, and 475 is collectively maintained by the home provider and by the respective range provider.

In further implementations, the computing device 125 may calculate or determine a service qualification using deployed technologies, supported services (e.g., broadband and/or ethernet services, such as voice, video, internet, etc.), speeds by technology for internet service, support voice services (VOIP, POTS, etc.), capacity or network congestion (e.g., office level, PON channel level, port capacity, network subscription limiters, etc.), etc. In some such implementations, the computing device 125 determines service qualifications over multiple polylines (e.g., using interconnected equipment and devices).

The computing device 125 may determine (e.g., via techniques described elsewhere herein) that the prospect location 420 is located closest to splice point 465 in the second range 460 for Provider B. In further implementations, the computing device 125 may determine that the prospect location 420 is too far from the splice point 475 in the third range 470 for the home provider (e.g., more than 1000 feet away, more than 2000 feet away, more than 4000 feet away, etc.). The computing device 125 may then determine that the prospect location 420 should connect to the network via the closest splice point (e.g., splice point 465).

The computing device 125 may function as part of the external qualification system 400B to determine one or more qualifications of external providers (e.g., Provider A and Provider B) when determining whether to connect the prospect location 420 to the network via a splice point maintained by the external provider(s) (e.g., splice point 455 and/or 465). In particular, a user device 405 (e.g., computing device 125, a device communicatively coupled to computing device 125, etc.) may query an external qualification service module 410 (e.g., stored on the computing device 125) to determine the qualifications of external providers (e.g., Provider A and/or Provider B) in providing network services to the prospect location 420. Depending on the implementation, the user device 405 is a mobile device (e.g., a cell phone, a wearable headset, an extended reality device, etc.). In further implementations, the user device 405 may be multiple devices functioning as one (e.g., a headset and an associated computing device).

In some implementations, the external qualification service module 410 interfaces with one or more devices associated with various providers via provider qualification APIs 412, 414. In some implementations, the external qualification service module 410 interfaces with each provider via a separate provider qualification API (e.g., Provider A qualification API 412 and Provider B qualification API 414). In further implementations, the external qualification service module 410 interfaces with each provider via a same provider qualification API. In still further implementations, the external qualification service module 410 interfaces with providers using a single provider qualification API for each programming language in which the provider device communicates. Depending on the implementation, the external qualification service module 410 and/or computing device 125 may store a model mapping that maps a language for each provider to the corresponding provider qualification API and/or stores translations for commands in each corresponding language.

The external qualification service module 410 may interface with the providers to determine qualifications and/or services offered by each respective provider. For example, the external qualification service module 410 may contact Provider A via a real-time request made through the Provider A qualification API 412. The external qualification service module 410 may then pull data from the provider(s) as retrieved through the real-time request(s) into a local dataset stored at the external qualification service module 410 and/or on a memory of the computing device 125.

The external qualification service module 410 may further interface with an aggregation service, such as a reseller marketplace, via an aggregated provider qualification API 416. In further implementations, the external qualification service module 410 may interface with a provider aggregation service via a request to the service requesting a particular service, speed, and/or period of time (e.g., via the aggregated provider qualification API 416). In some such implementations, the provider aggregation service gathers additional or alternate information from the providers and provides a response via the aggregated provider qualification API 416.

Depending on the implementation, the external qualification service module 410 may retrieve imported data 418 (e.g., stored at a database such as data store(s) 132) associated with the home provider and/or including a model for analyzing the data retrieved via the APIs 412, 414, 416 and generating a quote of a rate to provide a requested service. In some such implementations, the model condenses the retrieved data across different sources to an output that a user can more easily interpret and understand. In some such implementations, the output includes prices and services available to a user for a prospect location 420. In further implementations, the model uses a stored mapping (e.g., as described above) to interpret and/or translate responses retrieved via the qualification APIs 412, 414, 416. Depending on the implementation, the model may output a single price and/or service (e.g., depending on a user preference (e.g., for cheapest price, greatest service, particular service for longest period, etc.) and/or on some other indication in an initial or subsequent request). In further implementations, the model may output multiple prices and/or services (e.g., a complete list of everything available, a ranked list (based on price, service availability, length of time, etc.), and/or any other such plurality of options). In some implementations, if data is incomplete from a provider, the output may include an indication that particular details are missing, or the computing device 125 may determine to refrain from outputting the particular provider service/price.

Figure 5:
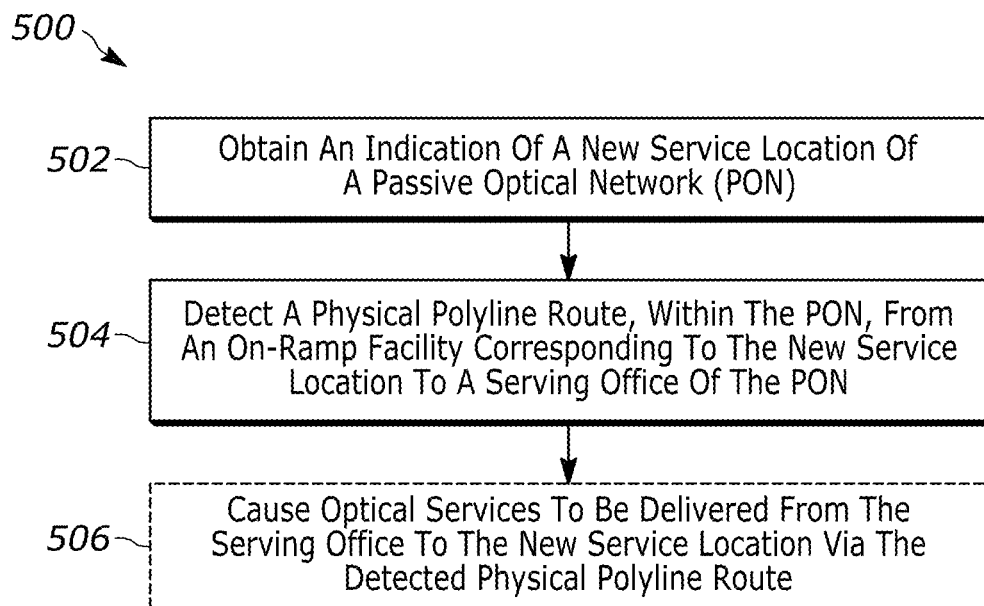
FIG. 5 illustrates a flow diagram of an example method for performing an upstream trace operation in a PON of FIG. 1A and providing services to a service location based on the upstream trace operation.

FIG. 5 illustrates a flow chart of a method 500 for detecting a physical polyline and performing an upstream trace operation to provide services to a prospective user. Depending on the implementation, the method 500 may be performed by a computing device 125, an upstream trace module 136 stored on the computing device 125, and/or another computing device communicatively coupled to elements of a PON 100. Although the method 500 is described with regard to elements of FIG. 1A, it will be understood that such is for case of description only, and that other electronic devices and/or components may perform part or all of the method 500 as described below.

At block 502, the computing device 125 obtains an indication of a new service location of a PON. Depending on the implementation, the new service location may include one or more of a residential service location, a commercial service location, a non-commercial service location, a mixed-use service location, etc. Depending on the implementation, the computing device 125 may obtain the indication of the new service location from a user device; from a module in the computing device 125 (e.g., by analyzing prospective new locations); responsive to a user input, responsive to a selection by an owner, user, or resident of the new service location of a particular service; responsive to an indication of potential redundant services; and/or any other such indication as described herein.

Figure 6:
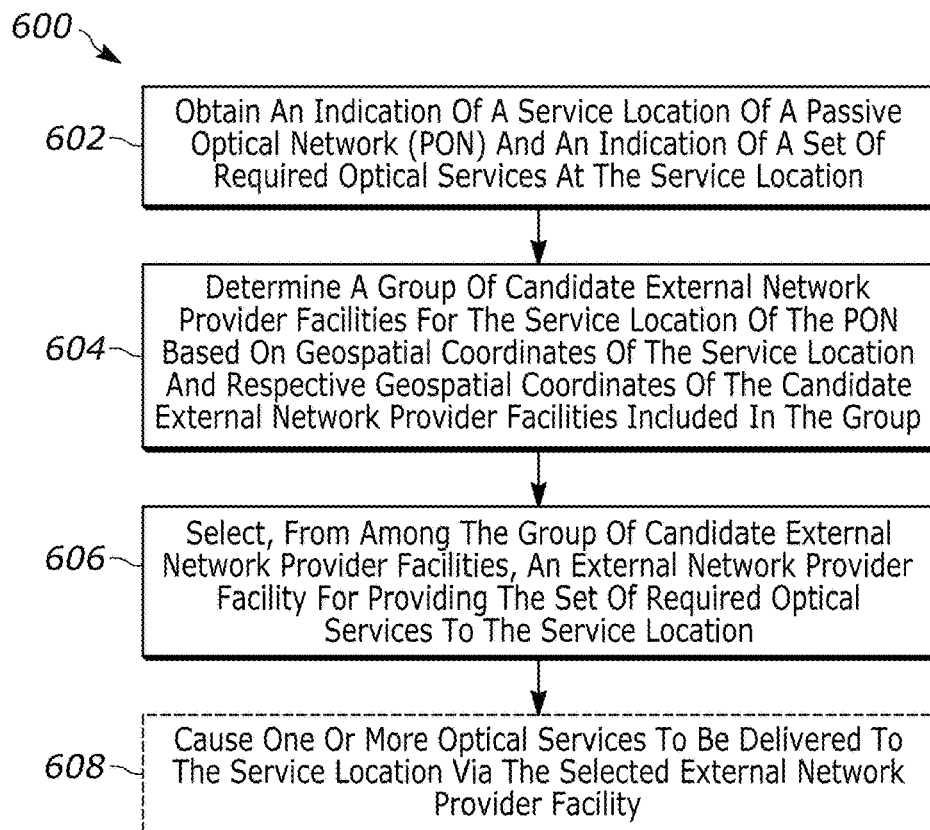
FIG. 6 illustrates a flow diagram of an example method for determining candidate external network providers to provide services to a service location, using a PON of FIG. 1A.

In further implementations, the computing device 125 additionally or alternatively receives an indication of an on-ramp facility (e.g., an indication of a splice point after a process as described with regard to FIG. 6) and/or one or more parameters regarding the on-ramp facility. Depending on the implementation, the indication of the on-ramp facility may include an on-ramp facility ID, a general facility ID, a facility type (e.g., fiber terminal, fiber splice case, fiber loop, fiber cable, etc.), and/or any other such information as described herein. In further implementations, the parameters may include an upstream trace mode (e.g., real-time, online, offline, etc.) and/or any other such characteristic as described herein. Depending on the implementation, the indication and/or parameters are via a request message (e.g., an HTTP request including a body and/or header with the information).

In further implementations, the computing device 125 may access or otherwise obtain information regarding the splice point, the prospect location, one or more entities along potential polyline routes, etc. The computing device may subsequently determine whether any of the splice point characteristics match the received indication (e.g., a particular ID, a particular facility ID, a particular facility type, one or more geographic characteristics, etc.). In some such implementations, the computing device determines to obtain information associated with the physical polyline route (e.g., one or more optical circuit entities and/or buildings associated with the optical circuit entities). In some implementations, if the computing device 125 does not determine a splice point that fulfills the request is present, then the computing device 125 returns an indication that a result could not be found and ends the method 500.

At block 504, the computing device 125 detects a physical polyline route, within the PON, from an on-ramp facility corresponding to the new service location to a serving office of the PON. In some implementations, the computing device 125 performs the detecting based on (i) respective geospatial locations of a plurality of optical components of the PON and/or (ii) interconnections of the plurality of optical components. Depending on the implementation, the plurality of optical components includes the on-ramp location, a terminal (e.g., an OLT) disposed at the serving office, and/or at least one optical fiber optically connecting the on-ramp location and the terminal.

In some implementations, the computing device 125 detects the physical polyline route by causing a test signal to be transmitted across at least a segment of a candidate physical polyline route. In further implementations, the computing device 125 detects the physical polyline route using one or more databases (e.g., by querying the one or more databases for data associated with physical polyline routes within a predetermined geographic area and/or range, as described above with regard to FIG. 3).

In some implementations, the computing device 125 obtains an indication of a required set of services (which may include optical and/or other types of services) for the new service location. In some such implementations, detecting the physical polyline route corresponding to the new service location then includes detecting a physical polyline route having capabilities to support the required set of services. Depending on the implementation, the required set of services includes at least one of: (i) service at a particular wavelength band, (ii) data communication service, (iii) broadband service, and/or (iv) any other such service.

In some implementations, the computing device 125 selects, from a plurality of on-ramp facilities, the on-ramp facility corresponding to the new service location based on at least one of: (i) least cost routing from the new service location, (ii) geographical proximity to the new service location (iii) a required set of services to be provided at the new service location (iv), capabilities of one or more physical polyline routes, each of which has the on-ramp facility as a node and/or an endpoint, and/or (v) any other such metric as described herein. In some such implementations, the capabilities of the one or more physical polyline routes include at least one of: (i) a particular wavelength band capability, (ii) data communication service capability, (iii) broadband service capability, and/or (iv) any other such capability as described herein. In further implementations, the computing device 125 identifies the capabilities of the one or more physical polyline routes based on one or more databases associated with the one or more physical polyline routes.

In some implementations, the on-ramp facility is a first on-ramp facility of a plurality of on-ramp facilities, and detecting the physical polyline route includes obtaining information indicative of one or more characteristics of the plurality of on-ramp facilities. In some such implementations, the computing device 125 may then calculate a metric for at least some of the plurality of on-ramp facilities based on respective characteristics of the one or more characteristics of the plurality of on-ramp facilities. In further implementations, calculating the metric includes determining that a respective metric for the first on-ramp facility is greater than respective metrics for a remainder of the at least some of the plurality of on-ramp facilities. In still further implementations, the computing device 125 obtains the information indicative of the one or more characteristics by obtaining the information from one or more databases associated with the plurality of on-ramp facilities.

In some implementations, the computing device 125 detects the physical polyline route by searching along the polyline route for one or more entities upstream of the splice point (e.g., located closer to the serving office along the physical polyline route). In some implementations, the computing device 125 performs the trace offline (e.g., using one or more records stored on one or more databases). In further implementations, the computing device 125 performs the trace in real-time (e.g., calculating a position of a potential entity using a trace API and/or trace graph). If the computing device does not find or calculate a present entity (e.g., does not detect a presence of a facility to provider services), the computing device 125 returns a message indicating that a result could not be found and ends the method 500. Otherwise, the computing device 125 generates a result including the physical polyline route and returns the result to a user. In some implementations, the computing device 125 performs to trace to determine whether one or more facilities that provide one or more services and/or have one or more characteristics or qualifications is present along the physical polyline route and generates the result if so.

At block 506, the computing device 125 may cause services to be delivered from the serving office to the new service location via the detected physical polyline route (e.g., by provisioning selected services responsive to receiving an indication of a selection of services). In some implementations, the computing device 125 causes the services to be delivered to the new service location by causing data communication services to be delivered to the new service location, causing broadband services to be delivered to the new service location, and/or causing any other such services as described herein to be delivered to the new service location.

In some implementations, the computing device 125 refrains from causing the services to be delivered. For example, the computing device 125 may cause services to be delivered from the serving office to a first new service location via a first physical polyline route, and may further obtain an indication of a second new service location of the PON, detect a second physical polyline route, within the PON, from a respective on-ramp facility corresponding to the second new service location to a respective serving office of the PON, and assigns a second new service location to the second physical polyline route for providing services to the second new service location from the serving office. In still further implementations, the computing device 125 does cause services to be delivered to the second location as well.

FIG. 6 illustrates a flow chart of a method 600 for performing external ethernet qualification processes to provide services to a prospective user. Depending on the implementation, the method 600 may be performed by a computing device 125, an external service module 138 stored on the computing device 125, and/or another computing device communicatively coupled to elements of a PON 100. Although the method 600 is described with regard to elements of FIG. 1A, it will be understood that such is for case of description only, and that other electronic devices and/or components may perform part or all of the method 600 as described below.

At block 602, the computing device 125 obtains an indication of a service location of a PON service provider and an indication of a set of required services at the service location. Depending on the implementation, the set of required services includes at least one of: (i) service at a particular wavelength band, (ii) data communication service, (iii) broadband service, and/or any other such service as described herein. Depending on the implementation, the new service location may include one or more of a residential location, a commercial location, a non-commercial location, a mixed-use or mixed purpose location, etc. Depending on the implementation, the computing device 125 may obtain the indication of the new service location from a user device; from a module in the computing device 125 (e.g., by analyzing prospective new locations); responsive to a user input, responsive to a selection by an owner, user, or resident of the new service location of a particular service; responsive to an indication of potential redundant services; and/or any other such indication as described herein.

In some implementations, the computing device 125 obtains a site location and/or parameters for a service location as or as part of the indication of the service location. In particular, the indication of the service location may include an ID of the service location, a latitude of the service location, a longitude of the service location, a geometry of the service location (e.g., a point within a building or parcel, detected and/or identified at a centroid level of accuracy, where the polygon outline of the structure is identified by a geocoding service and/or technique), etc. Similarly, the parameters may include a list of on-ramp facility types, a search distance for the search (e.g., as described above with regard to FIGS. 6 and/or 7), etc. Depending on the implementation, the indication and/or parameters are via a request message (e.g., an HTTP request including a body and/or header with the information). In some implementations, the computing device 125 may receive the service location information and subsequently retrieve one or more default parameters regarding a search process for an on-ramp facility, polyline, etc. as described above with regard to FIGS. 3-4B (e.g., search within a range of 4000 feet, search up to a predetermined number of network providers, etc.).

At block 604, the computing device 125 determines a group of candidate external network provider facilities for the service location of the PON. In some such implementations, the computing device 125 determines the group based on geospatial coordinates of the service location and respective geospatial coordinates of the candidate external network provider facilities included in the group. In further implementations, the group of candidate external network provider facilities are excluded from the PON and provided by respective external network service providers other than the service provider of the PON.

In some implementations, the computing device 125 determines that the service location is outside of a range of one or more internal network provider facilities associated with the service provider of the PON. In such implementations, the computing device 125 may determine the group of candidate external network facilities responsive to determining that the service location is outside of the range.

In some implementations, the computing device 125 obtains, from one or more external network providers associated with the group of candidate external network provider facilities, a listing of services associated with a respective candidate external network provider facility of the candidate external network provider facilities. Depending on the implementation, the computing device 125 determines the group of candidate external network facilities based on the listing of services associated with the respective candidate external network provider facility. In further implementations, the computing device 125 selects the external network facility at block 606 below based on the listing of services.

In some implementations, the computing device 125 obtains the listing of services and/or particular services for the listing of services from one or more external databases associated with the one or more external network providers (e.g., via an API as described above with regard to FIG. 4B). In some such implementations, the one or more external databases stores data in a first programming language and one or more internal databases associated with the PON service provider stores data in a second programming language. As such, in such implementations, the computing device 125 may translate the listing of services from the first programming language to the second programming language (e.g., via a mapping, via the API configured to automatically convert between the first and second programming language, etc.).

In some implementations, the group of candidate external network provider facilities includes a list of one or more parameters for each candidate external network provider facilities. For example, the list may include at least one of: (i) a network provider name, (ii) a network provider facility location, (iii) a speed provided by the network provider, (iv) a tier of service provided by the network provider, (v) a particular product or service provided by the network provider, (vi) a distance of the facility to the service location, and/or (vii) any other such parameters.

The computing device 125 may then perform a least cost routing analysis between the service location and each facility of the one or more candidate external network provider facilities. As such, the computing device 125 may determine a least cost route distance from the service location to the respective facility as well as a geometry of the least cost route. In some implementations, if the least cost route for the respective facility is within a predetermined distance, then the computing device 125 adds the respective facility to the group of external network provider facilities. In further implementations, if the computing device 125 determines that the least cost route distance is greater than the predetermined distance threshold, the computing device 125 does not add the facility to the group of candidate external network provider facilities. In still further implementations, the computing device 125 adds the facility anyway if the computing device determines that the service location is able to otherwise connect to the facility (e.g., via a wide area network (WAN) interface (WIF)). For example, if an input speed of a service can be serviced within the speed range, the computing device 125 may add the facility. Similarly, if the facility is able to provide the speed range of service within a predetermined cost tier, the computing device 125 may add the facility. The computing device 125 may then generate the group of candidate external network provider facilities and provides to a user (e.g., via a user device, such as user device 405 of FIG. 4B).

At block 606, the computing device 125 selects, from among the group of candidate external network provider facilities, an external network provider facility for providing the set of required services to the service location. In some implementations, the computing device 125 selects the external network provider facility based on respective characteristics of each candidate external network provider facility and the set of required services at the service location. Depending on the implementation, the computing device 125 selects the external network provider facility responsive to an indication from the user (e.g., via a user device), responsive to a command from a module in computing device 125, responsive to a determination regarding the services provided by each of the group of candidate external network providers, and/or in response to another indication as described herein. In some implementations, the computing device 125 displays a listing of one or more members of the group of candidate external network providers, and the selecting occurs responsive to a user indication of a particular candidate external network provider.

At block 608, the computing device 125 may cause one or more services (e.g., optical and/or other types of services) to be delivered to the service location via the selected external network provider facility or a selected internal network provider facility (e.g., responsive to receiving an indication of a selection of services). In some implementations, causing the services to be delivered to the serving location includes: causing data communication services to be delivered to the service location, causing broadband services to be delivered to the service location, and/or causing any other such services to be delivered to the service location as described herein.

In some implementations, the computing device 125 may determine a candidate internal network provider facility associated with the service provider for the service location of the PON. In some implementations, the computing device 125 determines the candidate internal network provider facility based on geospatial coordinates of the service location and respective geospatial coordinates of the candidate internal network provider facility. Depending on the implementation, the computing device 125 may cause services to be delivered to the service location via the internal network provider facility or external network facility depending on an operation status of the facility and/or equipment associated with such. For example, in some implementations, the computing device 125 causes the one or more services to be delivered to the service location via the internal or external network provider facility responsive to failing to cause the one or more services to be delivered to the service location via the selected external or internal network provider facility and/or detecting such failure. In further implementations, the computing device 125 causes the one or more services to be delivered to the service location via the selected external network provider facility is responsive to failing to cause the one or more services to be delivered to the service location via the internal network provider facility and/or detecting a failure at the internal network provider facility.

In some implementations, the computing device 125 refrains from causing the services to be delivered. For example, the computing device 125 may cause services to be delivered from the serving office to a first service location, the set of required services may be a first set of required services, the group of candidate external network provider facilities may be a first group of candidate external network provider facilities, and the selected external network provider facility may be a first selected external network provider facility, for which the computing device 125 performs the steps described with regard to blocks 602, 604, 606, and 608. The computing device 125 may further obtain an indication of a second service location of the PON and an indication of a second set of required services at the second service location. The computing device 125 may then determine a second group of candidate external network provider facilities for the second service location of the PON (e.g., based on the geospatial coordinates of the second service location and respective geospatial coordinates of the second group of candidate externa network provider facilities). The computing device 125 may then select, from among the second group of candidate external network provider facilities, a second external network provider facility for providing the second set of required services to the second service location (e.g., based on respective characteristics of each external network provider facility and the second set of required services at the second service location). The computing device 125 may then assign the selected second external network provider facility to the second service location for providing the second set of required services to the second service location via the PON. In still further implementations, the computing device 125 does cause services to be delivered to the second location via the selected second external network provider facility as well.

Figure 7:
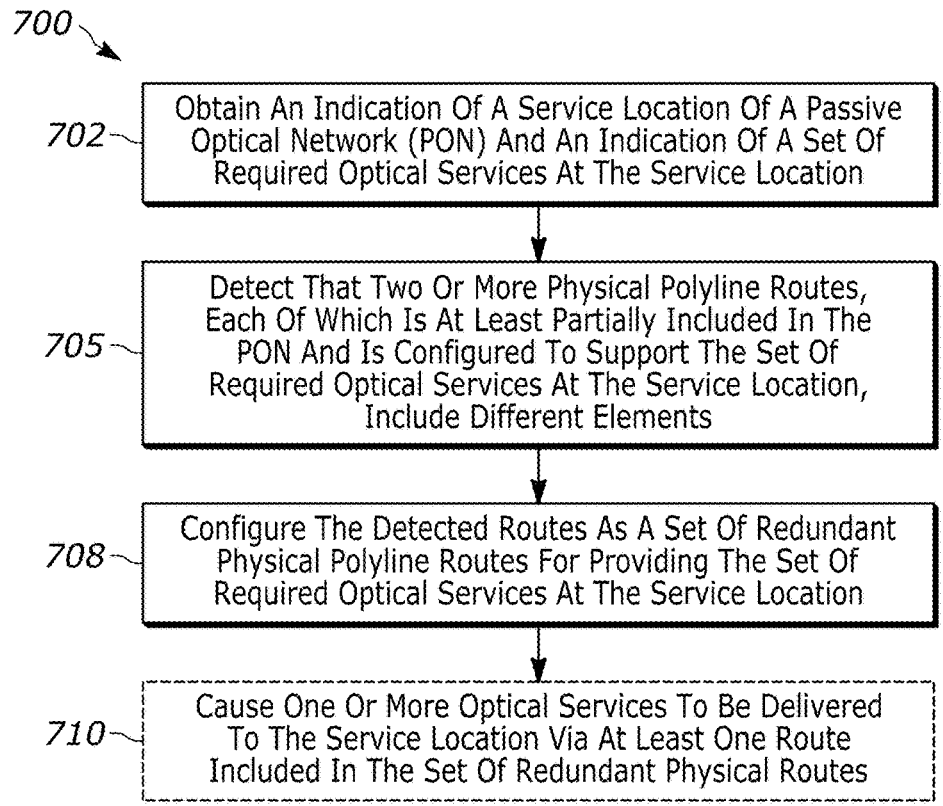
FIG. 7 depicts a flow diagram of an example method for providing redundancy for a service location of a PON, such as the PON of FIG. 1A.

FIG. 7 depicts a flow diagram of an example method 700 for providing redundancy for a service location of a PON, such as the PON 100 of FIG. 1A. In an embodiment, at least a portion of the method 700 of FIG. 7 may be executed by the redundancy module 140 of the PON 100. However, it is understood that the any one or more portions of the method 700 may be executed by other modules and/or components of the PON 100, and/or in PONs other than the PON 100. Additionally, in embodiments, at least a portion of the method 700 may operate in conjunction with at least a portion of one or more other methods described herein. Further, in some embodiments, the method 700 may include additional and/or alternate blocks other than those depicted in FIG. 7. For clarity of discussion and clarity of illustration, and not for limitation purposes, FIG. 7 discussed simultaneously herein and with simultaneous reference to FIGS. 1A and 1B.

Generally, the service location at which the set of required services is to be provided (e.g., a target or prospective service location) may include one or more residential, commercial, non-commercial, or mixed-use service locations. The service location may be a new or existing service location of the PON for which at least two redundant routes via the PON are to be provided, e.g., so that provision of services to the service location may be maintained if and when a servicing route (and/or component therein) experiences failure or degradation. Redundant routes through the PON generally differ in at least one different type of route element. For example, redundant routes for a service location may include different respective optical components, different respective on-ramp facilities of the PON, different respective optical line terminals (OLTs) of the PON, different respective physical polyline route segments of the PON which are optically connected to a specific primary optical fiber bundle that is included in each of the two or more physical polyline routes, and/or different respective provider serving facilities, to name a few.

Referring now to the example environment 150 of FIG. 1B to illustrate, the service location 155 has been optically connected to multiple onramps 162a, 162b, 162c, and 162d via respective last mile optical fibers 182a, 182b, 182c, and 182d terminating at one or more LMTUs (not shown in FIG. 1B) disposed at the service location 155. Via these connections, the service location 155 may be provided services (e.g., optical and/or other types of services to be consumed at the service location) by multiple redundant routes of different redundancy types. For example, via the last mile optical fiber 182a and the onramp 162a, two redundant physical polyline routes provide overall route redundancy for the service location 155. That is, from the onramp 162a, a first physical polyline route 180a terminates at the serving office 165a, and a second, redundant physical polyline route 180b terminates at the serving office 165a.

In another example, two redundant physical polyline routes provide optical segment and onramp redundancy for the service location 155. In some such examples, a first route includes the last mile optical fiber 182a, the onramp 162a, and the physical polyline route 180b terminating at the serving office 165a, and a second route which differs in an optical segment from the first route includes the last mile optical fiber 182b, the onramp 162b, and the physical polyline route 180c terminating at the serving office 165a. As such, the two routes share the optical segments disposed between the FDH 170 and the serving office 165a, but differ in the optical segments or fibers 168c and 168f and differ in the onramps 162a and 162b. For instance, the different optical segments or fibers 168e and 168f may be optically connected (e.g., via FDH 170) to the same primary optical fiber 168a, which may be an optical fiber bundle.

In yet another example, two redundant physical polyline routes provide serving office redundancy for the service location 155. In some such examples, a first route (e.g., last mile fiber 182a, onramp 162a, and physical polyline route 180a) terminates at a first serving office 165a of the PON 100, and a second route (e.g., last mile fiber 182d, onramp 162d, and physical polyline route 180c) terminates at another serving office 165b of the PON 100.

In still another example, two redundant physical polyline routes provide service provider redundancy for the service location 155. In some such examples, a first route (e.g., last mile fiber 182a, onramp 162a, and physical polyline route 180a) terminates at a serving office 165a of the PON 100, and a second route (e.g., last mile fiber 182c, onramp 162c, and physical polyline route 180g) terminates at an external facility office 172 provided by a service provider other than the service provider of the PON 100.

Of course, other differing elements among various redundant physical polyline routes via which the set of required services may be provided to the service location 155 are possible. For example, redundant physical polyline routes which differ in different external service provider facilities (e.g., where the different external service provider facilities are provided by different external network providers) may be detected, identified, and/or otherwise determined for the service location 155. For example, redundant physical polyline routes which differ in one or more optical components and/or one or more non-optical components may be detected, identified, and/or otherwise determined for the service location 155.

Returning now to the FIG. 7, at a block 702, the method 700 may include obtaining an indication of a service location 155 and an indication of a set of required services that are to be provided via the PON 100 at the service location 155. The indication of the service location may be, for example, a mailing or street address and/or some other type of indication of a geographical location (e.g., geospatial coordinates, etc.) at which the set of required services is to be provided. The indication of the service location and the indication of the set of required services may be obtained via any suitable means, e.g., via user input (e.g., at the servers 130 and/or at the computing device 125), from a database or file (e.g., which may be stored in the data store(s) 132), by utilizing a geographical mapping (e.g., a street map, graphical map, or network map of the PON, and/or data indicative thereof such as a data table or data file, any or all of which may be stored in the data store(s) 132), and/or the like. For example, referring to the environment 150 of FIG. 1B, an indication of the service location 155 may be obtained at the block 702 of the method 700.

At a block 705, the method 700 may include detecting that two or more physical polyline routes, each of which is configured to support the set of required services at the service location 155, include different elements. At least a portion of each of the two or more physical polyline routes may be included in the PON 100. The different or differing elements of the two or more routes may include different respective optical components, different respective non-optical components, different respective on-ramp facilities of the PON, different respective optical line terminals (OLTs) of the PON, different respective physical polyline route segments of the PON which are optically connected to a specific primary optical fiber bundle that is included in each of the two or more physical polyline routes, and/or different respective provider serving facilities (where the different respective provider serving facilities may or may not include an external serving facility), to name a few types of differing elements.

In embodiments, the detecting 705 that the two or more physical polyline routes include different elements may include detecting, identifying, or otherwise determining a group of physical polyline routes that are configured to support the set of required services at the service location 155 (e.g., based on optical and/or non-optical component capabilities, available and/or predicted bandwidth or capacity, etc.) in manners similar to those discussed elsewhere herein. Detecting that a particular physical polyline route is configured to support the set of required services at the service location may include, at a minimum, detecting or otherwise determining that the optical and/or non-optical components included in the particular physical polyline route are technically capable of supporting the set of required services. In some situations, the detecting and/or identifying of redundant routes may be additionally based on PON performance requirements and/or the performance requirements of one or more optical and/or non-optical components of the PON and the ability of various routes to achieve the performance requirements. In some situations, the detecting and/or identifying of redundant routes may be additionally based on a user indication of one or more desired types of redundancy. For example, the user may indicate that the service location is to have redundancy in on-ramp facilities, in one or more optical and/or non-optical components, in optical and/or non-optical route segments, in provider serving facilities at serving offices (e.g., OLTs and/or other types of terminals at serving offices), in serving offices, and/or in service providers.

In embodiments, the detecting 705 that the two or more physical polyline routes include different elements may include qualifying one or more onramps for the service location 155. For instance, the detecting 705 may include executing at least a portion of the method 200 for qualifying onramps for service locations, e.g., as described elsewhere herein, and/or may include executing another method for qualifying onramps. Additionally or alternatively, the detecting 705 may include performing one or more upstream trace operations corresponding to the physical polyline routes associated with onramps for the service location. For instance, the detecting 705 may include at least a portion of the method 500 for performing a respective upstream trace operation for the physical polyline routes corresponding to at least some onramps for the service location (which may include one or more onramps which have been qualified for the service location), and/or may include executing another method for performing upstream trace operations of physical polyline routes. Still additionally or alternatively, the detecting 705 may include qualifying at least one external network service facility for the service location. For instance, the detecting 705 may include executing at least a portion of the method 600 for qualifying external network facilities for service locations, e.g., as described elsewhere herein, and/or may include executing another method for qualifying external network facilities for service locations.

In embodiments, the detecting 705 that the two or more physical polyline routes include different elements may be based on respective geospatial locations of a plurality of optical components of the PON 100 and interconnections of the plurality of optical components. For example, at least some of the respective geospatial locations of the plurality of PON optical components and their interconnections may be obtained from respective geospatial coordinates transmitted from at least some of the optical components of the PON 100. Additionally or alternatively, at least some of the respective geospatial locations of the plurality of PON optical components and their interconnections may be obtained from a user indication of an address or other type of indication of the geo-spatial location of the service location, e.g., via a user interface and/or via a file. Additionally or alternatively, at least some of the respective geospatial locations of the plurality of PON optical components and their interconnections may be obtained by accessing one or more data stores (e.g., data store 132) in which indications of respective geospatial locations (such as geo-spatial coordinates, nearest street or mailing addresses, or other type of indications) of at least some of the optical components are stored. Still additionally or alternatively, at least some of the respective geospatial locations of the plurality of PON optical components and their interconnections may be obtained by accessing a network map of the PON, a graphical street map, a data table or file indicative of geographical layout of the PON, and/or the like (which may be stored in the data store 132) to determine respective geospatial locations of at least some of the optical components.

In embodiments, the detecting 705 that the two or more physical polyline routes include different elements includes detecting a plurality of candidate physical polyline routes for providing the set of required services to the service location 155, where each candidate physical polyline route is configured to support the set of required services at the service location and is at least partially included in the PON 100, and selecting, from among the plurality of candidate physical polyline routes, the two or more physical polyline routes to be the set of redundant physical polyline routes for providing the set of required services to the service location 155. As previously discussed, such routes are generally referred to herein as "redundant" physical polyline routes as the routes are redundant with respect to providing the set of required services to the service location 155 even though the routes differ in one or more route elements. The selecting may be based on, for example, respective optical components included in each candidate physical polyline route; respective detected and/or predicted congestion, bandwidth availability, and/or capacity of the each candidate physical polyline route; a total number of different elements of the two or more physical polyline routes (or, said another way, the total number of elements which are different between the two or more physical polyline routes); a total number of types of different elements of the two or more physical polyline routes (or, said another way, the total number of types of elements which are different between the two or more physical polyline routes); an indication of a user selection; and/or other selection criteria. For example, the selecting may include selecting a first route to instead of a second route to provide serving office redundancy for the service location 155 based on the first route having a greater predicted capacity than the predicted capacity of the second route.

At a block 708, the method 700 may include configuring, in accordance with the different elements, the detected two or more physical polyline routes to be the set of redundant physical polyline routes for providing the set of required services to the service location 155. For example, an indication of an association between the service location 155 and the set of redundant physical polylines routes may be stored in the data store 132 or some other memory which is accessible to the servers 130. In some embodiments, multiple redundant route alternatives may be associated with the service location 155, where each route of the multiple redundant routes may include a different type of redundancy so that the PON 100 is able to maintain the delivery of services to the service location 155 in spite of different type and locations of failures and/or degradations within the PON 100. As such, an indication of a primary or main physical polyline route for the service location 155 may be stored (e.g., at the data store 132 and/or other memories), and additional indications of different secondary physical polyline routes (e.g., for back-up, failovers, etc.) for one or more different types of redundancies may be stored (e.g., at the data store 132 and/or other memories). Applications at the server 130 may utilize the stored association(s) to initiate the delivery of services to the service location 155 and/or to reroute services to the service location 155, e.g., upon detection of a full or partial failure of an optical component, upon detection of a degradation in the PON 100, a segment within the PON 100, and/or an optical component of the PON 100, for planned maintenance or diagnostics of one or more optical components, upon receiving a user instruction, etc. Additionally, in some embodiments, an indication of an association between the service location 155 and the set of redundant physical polylines routes may be provided to a user interface (e.g., of the servers 130 and/or the computing device 125) and/or to other applications, if desired.

In some embodiments, the configuring 708 may include providing an indication of at least portion of the association between the service location 155 and the set of redundant physical polylines routes to one or more various optical components (e.g., the servers 130 and/or applications executing thereon, serving offices, terminals, OLTs, FDHs, FDTs, onramps, LMTUs, etc.) to thereby configure the optical components with the association. For example, various optical components may be configured to utilize the indicated at least the portion of the locally stored association to (re) route services via a different associated redundant route upon locally detecting a partial or full failure or a degradation within the servicing polyline route, (e.g., failover scenarios), when performing localized maintenance or diagnostics, etc.

At a block 710, the method 700 may include causing one or more services (e.g., one or more optical and/or other types of services) to be delivered to the service location 155 via the configured set of redundant physical polyline routes. For example, at the block 710 the method 700 may include sending an instruction to the serving office(s) and the LMTU associated with the service location 155 (and/or to any intermediate components which are optically disposed between the serving office(s)) to provide (and/or to initiate the providing of) the one or more services to the LMTU in accordance with the set of redundant physical polyline routes for the service location 155. Accordingly, the block 710 may include delivering end-user content for consumption at the service location 155 via a selected one of the set of redundant physical polyline routes. The selection may be based on a designation of a route as being a primary route, secondary route, etc. and/or may be based on a detected or predicted situation or state of delivery of services to the service location 155, such as "normal," "component X compromised," "component Y to be taken out of service," "optical segment Z operating at half-capacity," etc.

Of course, in some embodiments, the redundancy module 140 may execute multiple instances of at least a portion of the method 700, e.g., for different service locations in parallel and/or sequentially. Accordingly, in an embodiment, the method 700 may further include obtaining an indication of a second service location of the PON and an indication of a second set of required services at the second service location, detecting (e.g., based on the respective geospatial locations of the plurality of optical components of the PON and the interconnections of the plurality of optical components) that a second set of two or more physical polyline routes and configured to support the second set of required services at the second service location include a second set of different elements, and configuring, in accordance with the second set of different elements, the second set of two or more physical polyline routes corresponding to the second service location to be a second set of redundant physical polyline routes for providing the second set of required services to the second service location. An indication of the association between the second service location and the second set of redundant physical polyline routes (which may or may not provide different types of redundancy) may be stored at the data store 132 and/or locally at various optical components of the PON 100, e.g., in manners similar to those discussed above. Optionally, in this embodiment, the method 700 may further include causing at least one service to be delivered to the second service location via the second set of redundant physical polyline routes. That is, the stored association corresponding to the second service location may be utilized by the servers 130 and/or various applications executing at the servers 130 and/or at the various optical components to route (and re-route) services to the second service location.

Additional Considerations

It is noted that although the above description describes systems, methods, and/or techniques within a passive optical network (PON), it is envisioned that at least portions of the systems, methods, and/or techniques described herein may be easily, additionally, and/or alternatively applied to hybrid networks, such as those networks which include both a PON and at least one other network that utilizes a type of networking or transport technologies other than optical networking technology, and/or to networks which do not include a PON. For example, a hybrid network may include a PON and at least one of a copper network, one or more digital subscriber line (DSLs), an Ethernet network, a packet network, networking technologies which comport with communications and/or data networking standards, and/or networks which utilize physical or wired (e.g., not wireless) transport mechanisms. That is, a hybrid network may include both optical components (e.g., as described above) and non-optical components (e.g., digital subscriber line access multiplexers (DSLAMs)), various on-ramp facilities of a hybrid network may include optical and/or non-optical on-ramp facilities, various provider serving facilities at serving offices of a hybrid network may include optical and/or non-optical serving facilities, various transmission media and/or lines or connecting segments within the hybrid network may include optical and/or non-optical transmission media, various polyline route within the hybrid network may include optical and/or non-optical components, and the like. In implementations in which the network is or includes non-optical components, the non-optical components may be in place of or in addition to the optical components (for example, a DSLAM may be part of a system in addition to or in place of an OLT).

For example, the systems, methods, and/or techniques described herein may be easily adapted to qualify on-ramps for hybrid networks and/or for networks which do not include a PON, detect and/or trace upstream polyline routes for a service location of a hybrid network and/or of a network which does not include a PON, qualify external network facilities for providing services in conjunction with hybrid networks and/or with networks which do not include a PON, and/or provide route redundancy for services at a service location of a service provider, where the service location is serviced by a hybrid network including a PON and/or by none or more networks which do not include a PON.

Further, the above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged, or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Example 1. A method, comprising: obtaining, by one or more processors, an indication of a new service location of a passive optical network (PON); detecting, by the one or more processors, a physical polyline route, within the PON, from an on-ramp facility corresponding to the new service location to a serving office of the PON, the detecting based on (i) respective geospatial locations of a plurality of optical components of the PON, and (ii) interconnections of the plurality of optical components, and the plurality of optical components including the on-ramp facility, a network serving equipment disposed at the serving office, and at least one optical fiber optically connecting the on-ramp facility and the network serving equipment; and causing, by the one or more processors, end-user services to be delivered from the serving office to the new service location via the detected physical polyline route.

Example 2. The method of example 1, wherein the new service location is a first new service location, the physical polyline route is a first physical polyline route, the indication is a first indication, and the method further comprises: obtaining a second indication of a second new service location of a terrestrial communications network; detecting a second physical polyline route, within the terrestrial communications network, from a respective on-ramp facility corresponding to the second new service location to a respective serving office of the terrestrial communications network; and assigning the second new service location to the second physical polyline route for providing end-user services to the second new service location from the serving office.

Example 3. The method of example 2, further comprising causing end-user services to be delivered from the respective serving office to the second new service location via the second physical polyline route corresponding to the second new service location.

Example 4. The method of example 1, wherein the indication is a first indication, and further comprising: obtaining, by the one or more processors, a second indication of a required set of end-user services for the new service location, and wherein the detecting of the physical polyline route corresponding to the new service location includes detecting a physical polyline route having capabilities to support the required set of end-user services.

Example 5. The method of example 4, wherein the required set of end-user services includes at least one of: (i) service at a particular wavelength band, (ii) data communication service, or (iii) broadband service.

Example 6. The method of example 1, further comprising selecting, from a plurality of on-ramp facilities, the on-ramp facility corresponding to the new service location based on at least one of: least cost routing from the new service location; geographical proximity to the new service location; a required set of end-user services to be provided at the new service location; or capabilities of one or more physical polyline routes, each of which has the on-ramp facility as a node.

Example 7. The method of example 6, wherein the capabilities of the one or more physical polyline routes include at least one of: (i) a particular wavelength band capability, (ii) data communication service capability, or (iii) broadband service capability.

Example 8. The method of example 6, further comprising: identifying, by the one or more processors, the capabilities of the one or more physical polyline routes based on one or more databases associated with the one or more physical polyline routes.

Example 9. The method of example 1, wherein the causing of the end-user services to be delivered includes: automatically provisioning, by the one or more processors, the end-user services responsive to receiving an indication of a service selection.

Example 10. The method of example 1, wherein the on-ramp facility is a first on-ramp facility of a plurality of on-ramp facilities and the detecting of the physical polyline route includes: obtaining, by the one or more processors, information indicative of one or more characteristics of the plurality of on-ramp facilities; and calculating, by the one or more processors, a metric for at least some of the plurality of on-ramp facilities based on respective characteristics of the one or more characteristics of the plurality of on-ramp facilities.

Example 11. The method of example 10, wherein the calculating of the metric includes: determining, by the one or more processors, that a respective metric for the first on-ramp facility is greater than respective metrics for a remainder of the at least some of the plurality of on-ramp facilities.

Example 12. The method of example 10, wherein the obtaining of the information indicative of the one or more characteristics includes: obtaining, by the one or more processors, the information from one or more databases associated with the plurality of on-ramp facilities.

Example 13. The method of example 1, wherein the causing of the end-user services to be delivered to the new service location includes: causing data communication services to be delivered to the new service location.

Example 14. The method of example 1, wherein the causing of the end-user services to be delivered to the new service location includes: causing broadband services to be delivered to the new service location.

Example 15. The method of example 1, wherein the new service location includes at least one of a residential, commercial, non-commercial, or mixed-use service location.

Example 16. A system for tracing fibers upstream for a service location of a passive optical network (PON) of a PON service provider, the system comprising: one or more processors; and one or more memories storing a set of computer-executable instructions that, when executed by the one or more processors, cause the system to: obtain an indication of a new service location of a PON; detect a physical polyline route, within the PON, from an on-ramp facility corresponding to the new service location to a serving office of the PON, the detecting based on (i) respective geospatial locations of a plurality of optical components of the PON, and (ii) interconnections of the plurality of optical components, and the plurality of optical components including the on-ramp facility, a network serving equipment disposed at the serving office, and at least one optical fiber optically connecting the on-ramp facility and the network serving equipment; and cause end-user services to be delivered from the serving office to the new service location via the detected physical polyline route.

Example 17. The system of example 16, wherein the new service location is a first new service location, the physical polyline route is a first physical polyline route, the indication is a first indication, and the one or more processors execute the set of computer-executable instructions to cause the system further to: obtain a second indication of a second new service location of the terrestrial communications network; detect a second physical polyline route, within the terrestrial communications network, from a respective on-ramp facility corresponding to the second new service location to a respective serving office of the terrestrial communications network; and assign the second new service location to the second physical polyline route for providing end-user services to the second new service location from the serving office.

Example 18. The system of example 17, wherein the one or more processors execute the set of computer-executable instructions to cause the system further to: cause end-user services to be delivered from the respective serving office to the second new service location via the second physical polyline route corresponding to the second new service location.

Example 19. The system of example 16, wherein the indication is a first indication, and one or more processors execute the set of computer-executable instructions to cause the system further to: obtain, by the one or more processors, a second indication of a required set of end-user services for the new service location, and wherein the detecting of the physical polyline route corresponding to the new service location includes detecting a physical polyline route having capabilities to support the required set of end-user services.

Example 20. The system of example 19, wherein the required set of end-user services includes at least one of: (i) service at a particular wavelength band, (ii) data communication service, or (iii) broadband service.

Example 21. The system of example 16, wherein the one or more processors execute the set of computer-executable instructions to cause the system further to: select, from a plurality of on-ramp facilities, the on-ramp facility corresponding to the new service location based on at least one of: least cost routing from the new service location; geographical proximity to the new service location; a required set of end-user services to be provided at the new service location; or capabilities of one or more physical polyline routes, each of which has the on-ramp facility as a node.

Example 22. The system of example 21, wherein the capabilities of the one or more physical polyline routes include at least one of: (i) a particular wavelength band capability, (ii) data communication service capability, or (iii) broadband service capability.

Example 23. The system of example 21, wherein the one or more processors execute the set of computer-executable instructions to cause the system further to: identify the capabilities of the one or more physical polyline routes based on one or more databases associated with the one or more physical polyline routes.

Example 24. The system of example 16, wherein causing the end-user services to be delivered includes: automatically provisioning the end-user services responsive to receiving an indication of a service selection.

Example 25. The system of example 16, wherein the on-ramp facility is a first on-ramp facility of a plurality of on-ramp facilities, and the detecting of the physical polyline route includes: obtaining information indicative of one or more characteristics of the plurality of on-ramp facilities; and calculating a metric for at least some of the plurality of on-ramp facilities based on respective characteristics of the one or more characteristics of the plurality of on-ramp facilities.

Example 26. The system of example 25, wherein the calculating of the metric includes: determining that a respective metric for the first on-ramp facility is greater than respective metrics for a remainder of the at least some of the plurality of on-ramp facilities.

Example 27. The system of example 25, wherein the obtaining of the information indicative of the one or more characteristics includes: obtaining the information from one or more databases associated with the plurality of on-ramp facilities.

Example 28. The system of example 16, wherein the causing of the end-user services to be delivered to the new service location includes: causing data communication services to be delivered to the new service location.

Example 29. The system of example 16, wherein the causing of the end-user services to be delivered to the new service location includes: causing broadband services to be delivered to the new service location.

Example 30. The system of example 16, wherein the new service location includes at least one of a residential, commercial, non-commercial, or mixed-use service location.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for providing services to a service location of a passive optical network (PON), the method comprising:
    obtaining, by one or more processors, an indication of a new service location of a passive optical network (PON);
    obtaining, by the one or more processors, an indication of a set of required optical services at the service location;
    detecting, by the one or more processors, a physical polyline route, within the PON, from an on-ramp facility corresponding to the new service location to a serving office of the PON,
        the on-ramp facility included in a plurality of on-ramp facilities,
        the detecting including performing an upstream trace from the on-ramp facility to the serving office, thereby determining one or more characteristics of the on-ramp facility, the performing of the upstream trace including searching, along the physical polyline route in a direction from the on-ramp facility towards the serving office, for one or more upstream entities of the physical polyline route, the one or more upstream entities having respective capabilities to support the set of required optical services and including at least one optical component of the PON, and
        selecting the on-ramp facility based on the determined one or more characteristics of the on-ramp facility; and
    causing, by the one or more processors, end-user services to be delivered from the service office to the new service location via the detected physical polyline route.

2. The method of claim 1, wherein the obtaining of the indication of the new service location includes receiving, by the one or more processors, at least one of:
    a user input, or
    a user selection of the new service location.

3. The method of claim 1, wherein the performing of the upstream trace includes transmitting a test signal via an optical fiber or wire of the physical polyline route, the test signal including at least one of: a test pattern, an indication light, or a measurement signal.

4. The method of claim 3, wherein the test signal is transmitted from the on-ramp facility towards the serving office.

5. The method of claim 3, wherein the test signal is transmitted from the serving office towards the on-ramp facility.

6. The method of claim 1, wherein the performing of the upstream trace further includes detecting that the one or more upstream entities have the respective capabilities to support the set of required optical services.

7. The method of claim 1, wherein the upstream trace is performed offline using one or more records stored in one or more databases.

8. The method of claim 1, wherein the upstream trace is performed in real-time using a trace application programming interface (API) or trace graph.

9. The method of claim 1, wherein the selecting of the on-ramp facility includes:
    determining, by the one or more processors, one or more preferred characteristics of the on-ramp facility; and
    selecting, by the one or more processors, the on-ramp facility such that the one or more determined characteristics of the on-ramp facility match or exceed a target threshold of the one or more preferred characteristics.

10. A system for providing service to a service location of a passive optical network (PON), the system comprising:
    one or more processors; and
    one or more memories storing a set of computer-executable instructions that, when executed by the one or more processors, cause the system to:
        obtain an indication of a new service location of a passive optical network (PON);
        obtain an indication of a set of required optical services at the service location;
        detect a physical polyline route, within the PON, from an on-ramp facility corresponding to the new service location to a serving office of the PON, the on-ramp facility included in a plurality of on-ramp facilities, and the detection including:
            a performance of an upstream trace from the on-ramp facility to the serving office to thereby determine one or more characteristics of the on-ramp facility, the performance of the upstream trace including a search, along the physical polyline route in a direction from the on-ramp facility towards the serving office, for one or more upstream entities of the physical polyline route, the one or more upstream entities having respective capabilities to support the set of required optical services and including at least one optical component of the PON, and
            a selection of the on-ramp facility based on the determined one or more characteristics and one or more preferred characteristics of the on-ramp facility; and
        cause end-user services to be delivered from the service office to the new service location via the detected physical polyline route.

11. The system of claim 10, wherein the indication of the new service location is based on at least one of:
    a user input, or
    a selection by a user of the new service location.

12. The system of claim 10, wherein the performance of the upstream trace includes a transmission of a test signal via an optical fiber or wire of the physical polyline route, the test signal including at least one of: a test pattern, an indication light, or a measurement signal.

13. The system of claim 12, wherein the transmission of the test signal is from the on-ramp facility towards the serving office.

14. The system of claim 12, wherein the transmission of the test signal is from the serving office towards the on-ramp facility.

15. The system of claim 10, wherein the performance of the upstream trace further includes a detection that the one or more upstream entities of the physical polyline route have the respective capabilities to support the set of required optical services.

16. The system of claim 10, wherein the system performs the upstream trace offline using one or more records stored in one or more databases.

17. The system of claim 10, wherein the system performs the upstream in real-time using a trace application programming interface (API) or trace graph.

18. The system of claim 10, wherein:
the one or more processors execute the set of computer-executable instructions to cause the system further to determine one or more preferred characteristics of the on-ramp facility; and
the selection of the on-ramp facility is such that the one or more determined characteristics of the on-ramp facility match or exceed a target threshold of the one or more preferred characteristics.

* * * * *